(12) United States Patent
Kondo

(10) Patent No.: US 8,036,470 B2
(45) Date of Patent: Oct. 11, 2011

(54) IMAGE PROCESSING APPARATUS, IMAGE PROCESSING METHOD, AND PROGRAM

(75) Inventor: Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 955 days.

(21) Appl. No.: 11/966,326

(22) Filed: Dec. 28, 2007

(65) Prior Publication Data

US 2008/0181515 A1    Jul. 31, 2008

(30) Foreign Application Priority Data

Jan. 29, 2007    (JP) ................................ 2007-017458

(51) Int. Cl.
*G06K 9/36*    (2006.01)
(52) U.S. Cl. ...................................................... 382/232
(58) Field of Classification Search .................. 382/232, 382/240, 243, 276; 386/200, 201, 206, 219, 386/220; 709/231, 234, 236, 247; 715/720, 715/723

See application file for complete search history.

(56) References Cited

U.S. PATENT DOCUMENTS

| | | | | |
|---|---|---|---|---|
| 5,228,098 A * | 7/1993 | Crinon et al. | ................ | 382/240 |
| 5,543,925 A | 8/1996 | Timmermans | | |
| 5,612,900 A * | 3/1997 | Azadegan et al. | ............. | 709/247 |
| 6,810,131 B2 * | 10/2004 | Nakagawa et al. | ............ | 382/100 |
| 6,970,938 B2 * | 11/2005 | Sugiyama et al. | ............. | 709/231 |
| 2005/0262446 A1 | 11/2005 | Roh | | |
| 2007/0209003 A1 | 9/2007 | Obana et al. | | |

FOREIGN PATENT DOCUMENTS

| | | |
|---|---|---|
| EP | 1 686 788 A2 | 8/2006 |
| EP | 1 826 763 A2 | 8/2007 |
| EP | 1 826 764 A2 | 8/2007 |
| EP | 1 852 869 A1 | 11/2007 |
| JP | 2006-270187 | 10/2006 |
| WO | WO 00/05718 | 2/2000 |

* cited by examiner

*Primary Examiner* — Jose Couso
(74) *Attorney, Agent, or Firm* — Oblon, Spivak, McClelland, Maier & Neustadt, L.L.P.

(57) ABSTRACT

An image processing apparatus includes a compressed-feature extractor configured to extract a compressed feature from image data, the compressed feature being a feature having a less amount of data than the image data; a display controller configured to display the compressed feature; a processing-information determining unit configured to determine processing that is to be executed on the image data and to output processing information representing the processing; and a recorder configured to record the processing information on a recording medium in association with a processing feature, the processing feature being a specific feature of the image data on which the processing represented by the processing information is to be executed.

19 Claims, 19 Drawing Sheets

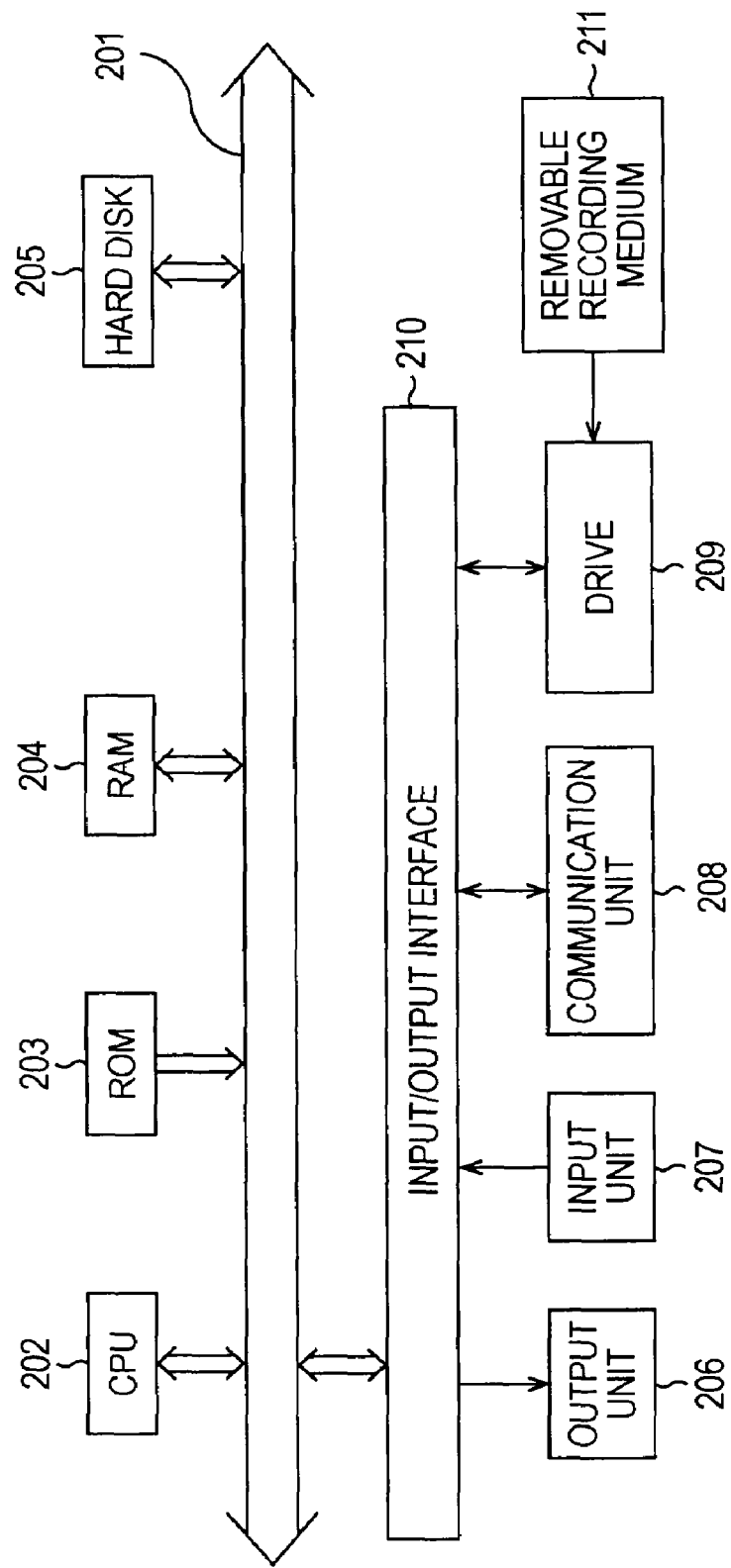

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2007-017458 filed in the Japanese Patent Office on Jan. 29, 2007, the entire contents of which are incorporated herein by reference.

BACKGROUND OF THE INVENTION

1. Field of the Invention

The present invention relates to image processing apparatuses, image processing methods, and programs. More specifically, for example, the present invention relates to an image processing apparatus, an image processing method, and a program that facilitate tasks of editing images.

2. Description of the Related Art

Methods of editing images can be classified into linear editing and non-linear editing.

In linear editing, processing corresponding to a user's operation is executed on image data that serves as what is called raw data, and processed image data obtained through the processing is recorded on a recording medium. At a time of playback, the processed image data recorded on the recording medium is played back and output.

On the other hand, in non-linear editing, image data that serves as raw data is recorded on a recording medium that allows random access, for example, a disk recording medium. Furthermore, information directly or indirectly representing processing that is to be executed on the image data according to an editing operation by a user, for example, processing information (parameter) representing processing that is to be executed on the image data, the editing operation by the user, or the like, is recorded. At a time of playback, the image data that serves as raw data is played back from the disk recording medium, the processing represented by the processing information is executed on the image data that serves as raw data, and the resulting image data is output.

For example, according to the art described in Japanese Unexamined Patent Application Publication No. 2006-270187, a parameter representing a region that is to be extracted from a wide-angle image is recorded in accordance with a pan operation, tilt operation, zoom operation, or the like performed by a user, and at a time of playback, the region represented by the parameter is extracted and output.

SUMMARY OF THE INVENTION

In both linear editing and non-linear editing, in order to perform editing, a user should play back image data that is to be edited, such as raw data, display an image corresponding to the image data on a display device, and find a frame in which processing, such as a zoom, is to be executed.

However, it is laborious to find a frame on which processing, such as a zoom, is to be executed by viewing the image itself corresponding to the image data that is to be edited.

For example, when editing is performed to zoom up an object with intense movement, the user carefully observes an image displayed on a display device to first check whether a moving object exists, and if the user finds any moving object, the user further determines whether the movement of the object is intense.

When editing is performed to zoom up an object with intense movement as described above, an editing task by the user can be facilitated if it is possible to check at a glance whether a moving object exists.

Furthermore, in some existing non-linear editing methods, processing information is recorded in association with a time code of a frame, and at a time of playback, processing represented by the processing information is executed on the frame having the time code associated with the processing information. Although time codes are used in such existing non-linear editing methods, it would be convenient if it is possible to perform non-linear editing without time codes.

It is desired that editing tasks be facilitated, and non-linear editing be allowed without time codes.

According to a first embodiment of the present invention, there is provided an image processing apparatus including compressed-feature extracting means for extracting a compressed feature from image data, the compressed feature being a feature having a less amount of data than the image data; display controlling means for displaying the compressed feature; processing-information determining means for determining processing that is to be executed on the image data and outputting processing information representing the processing; and recording means for recording the processing information on a recording medium in association with a processing feature, the processing feature being a specific feature of the image data on which the processing represented by the processing information is to be executed.

Furthermore, according to the first embodiment of the present invention, there is also provided an image processing method or a program for causing a computer to execute image processing including the steps of extracting a compressed feature from image data, the compressed feature being a feature having a less amount of data than the image data; displaying the compressed feature; determining processing that is to be executed on the image data and outputting processing information representing the processing; and recording the processing information on a recording medium in association with a processing feature, the processing feature being a specific feature of the image data on which the processing represented by the processing information is to be executed.

According to the first embodiment described above, a compressed feature is extracted from image data, the compressed feature being a feature having a less amount of data than the image data, and the compressed feature is displayed. Furthermore, processing that is to be executed on the image data is determined and processing information representing the processing is output. Then, the processing information is recorded on a recording medium in association with a processing feature, the processing feature being a specific feature of the image data on which the processing represented by the processing information is to be executed.

According to a second embodiment of the present invention, there is provided an image processing apparatus including compressed-feature extracting means for extracting a compressed feature from image data, the compressed feature being a feature having a less amount of data than the image data; display controlling means for displaying the compressed feature; processing-information determining means for determining processing that is to be executed on the image data according to an operation of operating means by a user, and outputting processing information representing the processing; and recording means for recording the processing information on a recording medium in association with the compressed feature extracted from the image data on which the processing represented by the processing information is to be executed.

Furthermore, according to the second embodiment of the present invention, there is also provided an image processing method or a program for causing a computer to execute image processing including the steps of extracting a compressed feature from image data, the compressed feature being a feature having a less amount of data than the image data; displaying the compressed feature; determining processing that is to be executed on the image data according to an operation of operating means by a user, and outputting processing information representing the processing; and recording the processing information on a recording medium in association with the compressed feature extracted from the image data on which the processing represented by the processing information is to be executed.

According to the second embodiment described above, a compressed feature is extracted from image data, the compressed feature being a feature having a less amount of data than the image data, and the compressed feature is displayed. Furthermore, processing that is to be executed on the image data is determined according to an operation of operating means by a user, and processing information representing the processing is output. Then, the processing information is recorded on a recording medium in association with the compressed feature extracted from the image data on which the processing represented by the processing information is to be executed.

The program according to the first embodiment or the second embodiment can be distributed by transmitting the program via a transmission medium or as recorded on a recording medium.

According to the first and second embodiments of the present invention, editing can be performed. Particularly, for example, editing tasks can be facilitated, and non-linear editing can be performed even without time codes.

BRIEF DESCRIPTION OF THE DRAWINGS

FIG. 19 is a block diagram showing an example configuration of a computer according to an embodiment of the present invention.

DESCRIPTION OF THE PREFERRED EMBODIMENTS

Figure 1:
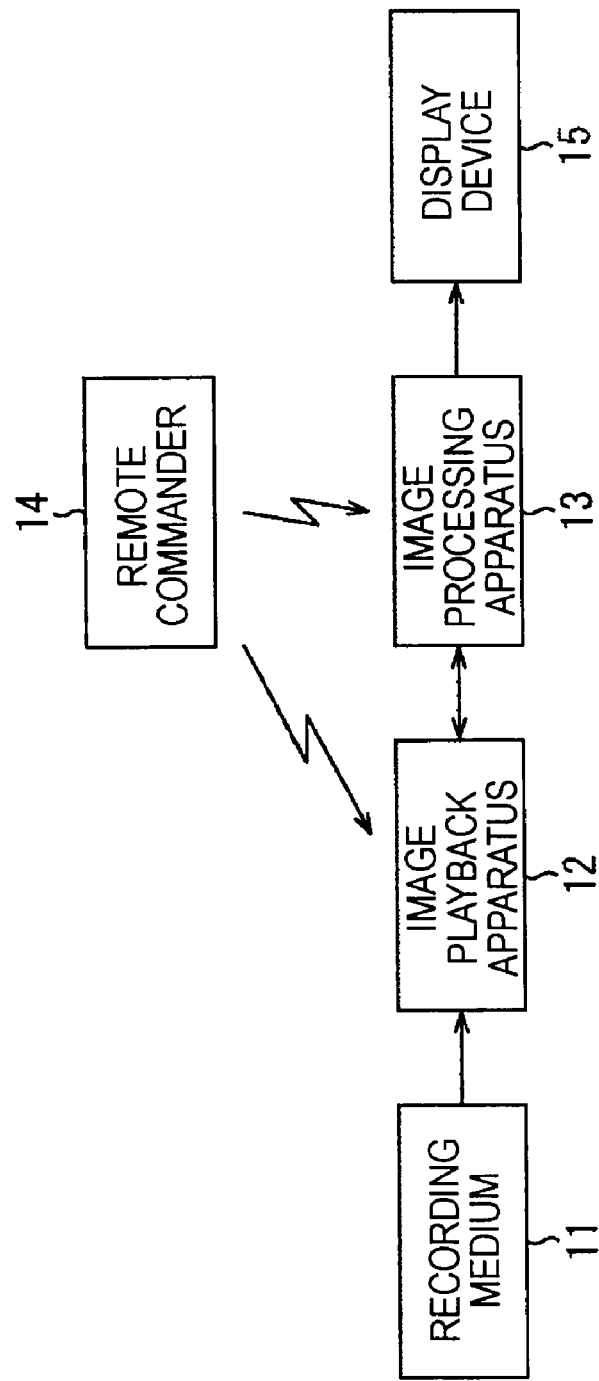
FIG. 1 is a block diagram showing an example configuration of an image processing system according to an embodiment of the present invention.

Before describing embodiments of the present invention, examples of correspondence between the features of the present invention and embodiments described in the specification or shown in the drawings will be described below. This description is intended to assure that embodiments supporting the present invention are described in this specification or shown in the drawings. Thus, even if a certain embodiment is not described in this specification or shown in the drawings as corresponding to certain features of the present invention, that does not necessarily mean that the embodiment does not correspond to those features. Conversely, even if an embodiment is described or shown as corresponding to certain features, that does not necessarily mean that the embodiment does not correspond to other features.

An image processing apparatus according to a first embodiment of the present invention is an image processing apparatus (e.g., an image processing apparatus 13 shown in FIG. 8) including:

compressed-feature extracting means (e.g., a feature extractor 121 shown in FIG. 8) for extracting a compressed feature from image data, the compressed feature being a feature having a less amount of data than the image data;

display controlling means (e.g., a display controller 125 shown in FIG. 8) for displaying the compressed feature;

processing-information determining means (e.g., a processing-information determining unit 46 shown in FIG. 8) for determining processing that is to be executed on the image data and outputting processing information representing the processing; and recording means (e.g., a recorder 123 shown in FIG. 8) for recording the processing information on a recording medium in association with a processing feature, the processing feature being a specific feature of the image data on which the processing represented by the processing information is to be executed.

The image processing apparatus may further include processing-feature extracting means (e.g., a feature extractor 41 shown in FIG. 8) for extracting the processing feature. In this case, the processing feature and the compressed feature are different information.

Also, the image processing apparatus according to the first embodiment may further include:

processing-feature extracting means (e.g., the feature extractor 41 shown in FIG. 8) for extracting the processing feature from the image data;

matching-feature detecting means (e.g., a matching-feature detector 42 shown in FIG. 8) for detecting a matching feature from processing features recorded on the recording medium, the matching feature being a processing feature having a value matching the processing feature extracted by the processing-feature extracting means; and processing reflecting means (e.g., a processing reflecting unit 49 shown in FIG. 8) for executing the processing represented by the processing information associated with the matching feature on the recording medium, on the image data from which the processing feature having the value matching the matching feature has been extracted.

Figure 9:
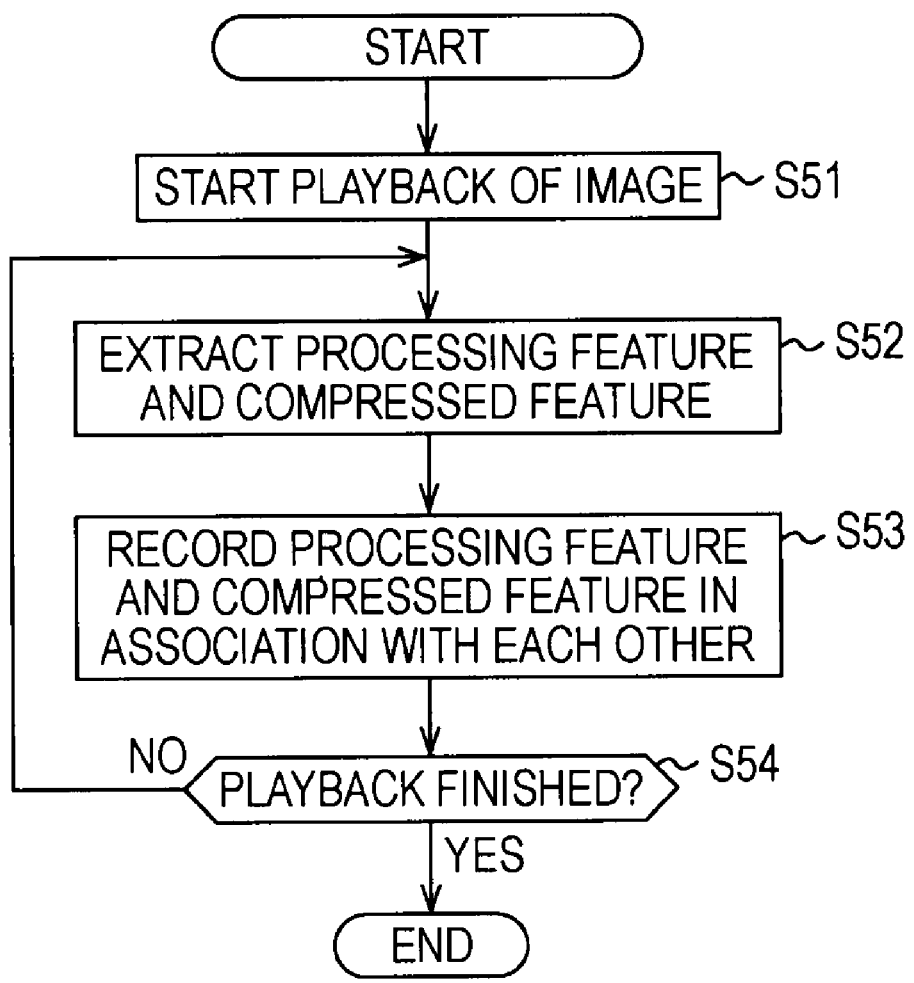
FIG. 9 is a flowchart of a feature recording process.
Figure 11:
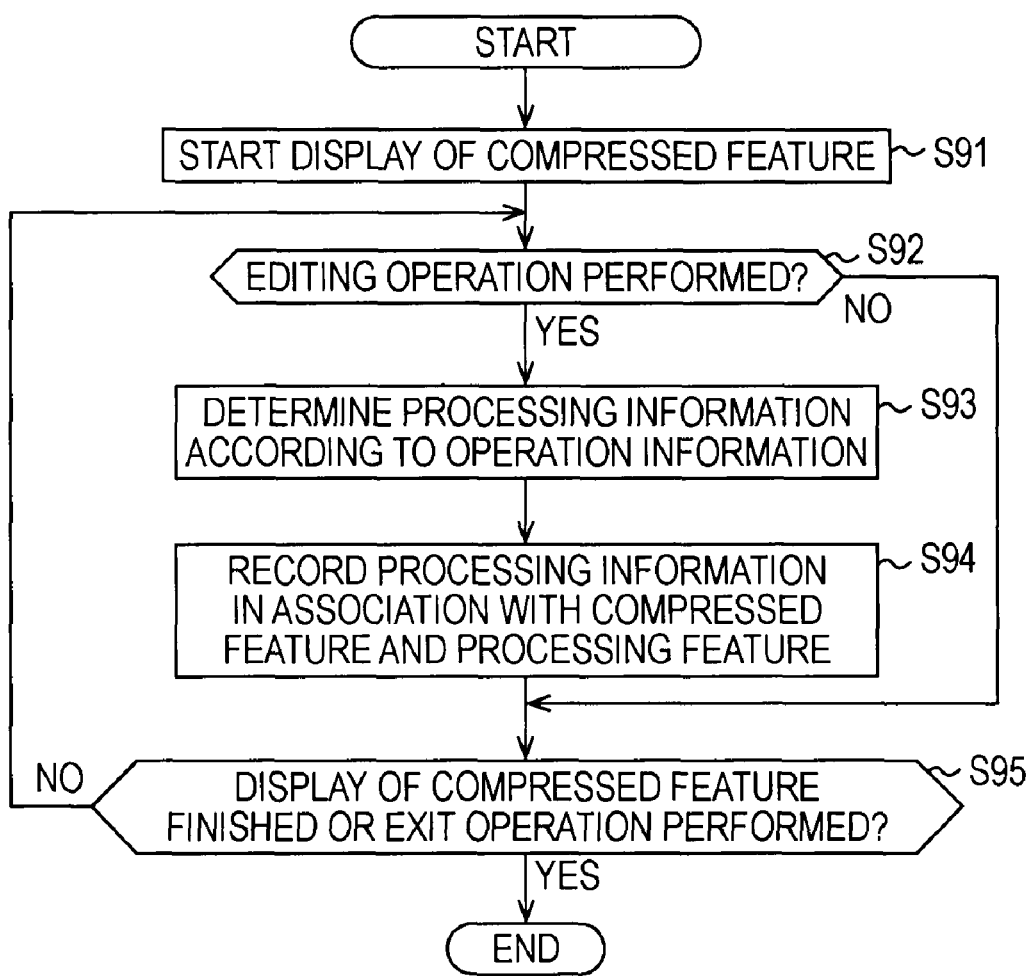
FIG. 11 is a flowchart of a simple editing process.

An image processing method or a program according to the first embodiment of the present invention is an image processing method or a program for causing a computer to execute image processing including the steps of:

extracting a compressed feature from image data, the compressed feature being a feature having a less amount of data than the image data (e.g., step S52 shown in FIG. 9);

displaying the compressed feature (e.g., step S91 shown in FIG. 11);

determining processing that is to be executed on the image data and outputting processing information representing the processing (e.g., step S93 shown in FIG. 11); and recording the processing information on a recording medium in association with a processing feature, the processing feature being a specific feature of the image data on which the processing represented by the processing information is to be executed (e.g., step S94 shown in FIG. 11).

An image processing apparatus according to a second embodiment of the present invention is an image processing apparatus (e.g., an image processing apparatus 13 shown in FIG. 18) including:

compressed-feature extracting means (e.g., a feature extractor 141 shown in FIG. 18) for extracting a compressed feature from image data, the compressed feature being a feature having a less amount of data than the image data;

display controlling means (e.g., a display controller 125 shown in FIG. 18) for displaying the compressed feature;

processing-information determining means (e.g., a processing-information determining unit 46 shown in FIG. 18) for determining processing that is to be executed on the image data according to an operation of operating means (e.g., a remote commander 14 shown in FIG. 18) by a user, and outputting processing information representing the processing; and recording means (e.g., a recorder 123 shown in FIG. 18) for recording the processing information on a recording medium in association with the compressed feature extracted from the image data on which the processing represented by the processing information is to be executed.

The image processing apparatus according to the second embodiment may further include:

matching-feature detecting means (e.g., a matching-feature detector 42 shown in FIG. 18) for detecting a matching feature from compressed features recorded on the recording medium, the matching feature being a compressed feature having a value matching the compressed feature extracted by the compressed-feature extracting means; and processing reflecting means (e.g., a processing reflecting unit 49 shown in FIG. 18) for executing the processing represented by the processing information associated with the matching feature on the recording medium, on the image data from which the compressed feature having the value matching the matching feature has been extracted.

An image processing method or a program according to the second embodiment of the present invention is an image processing method or a program for causing a computer to execute image processing including the steps of:

extracting a compressed feature from image data, the compressed feature being a feature having a less amount of data than the image data (e.g., step S52 shown in FIG. 9);

displaying the compressed feature (e.g., step S91 shown in FIG. 11);

determining processing that is to be executed on the image data according to an operation of operating means by a user, and outputting processing information representing the processing (e.g., step S93 shown in FIG. 11); and recording the processing information on a recording medium in association with the compressed feature extracted from the image data on which the processing represented by the processing information is to be executed (e.g., step S94 shown in FIG. 11).

Now, an embodiment of the present invention will be described with reference to the drawings.

FIG. 1 shows an example configuration of an image processing system according to an embodiment of the present invention. (A system herein refers to a logical combination of a plurality of apparatuses regardless of whether the constituent apparatuses are disposed within the same case.)

Referring to FIG. 1, the image processing system includes a recording medium 11, an image playback apparatus 12, an image processing apparatus 13, a remote commander 14, and a display device 15.

The recording medium 11 is, for example, a disk recording medium, such as a digital versatile disc (DVD) or a hard disk (HD), a tape recording medium, such as a magnetic tape, or a non-volatile semiconductor memory (recording medium), such as a flash memory, having recorded thereon content, such as a moving picture. The recording medium 11 can be attached to or detached from the image playback apparatus 12.

The image playback apparatus 12 is a drive that drives the recording medium 11, such as a DVD, a magnetic tape, or a flash memory. The image playback apparatus 12 plays back image data recorded on the recording medium 11 and supplies the image data to the image processing apparatus 13 according to an instruction from the image processing apparatus 13 or the remote commander 14.

In addition to a playback function for playing back image data from the recording medium 11, the image playback apparatus 12 may also have a recording function for recording image data on the recording medium 11. When an apparatus having both the playback function and the recording function is used as the image playback apparatus 12, the recording medium 11 may be a recording medium provided internally in the image playback apparatus 12 instead of a recording medium that can be attached to or detached from the image playback apparatus 12.

For example, when the recording medium 11 is a storage device provided at a site on the Internet, the image playback apparatus 12 may be an apparatus having a communication function for downloading image data from the storage device serving as the recording medium 11.

The image processing apparatus 13 processes image data supplied from the image playback apparatus 12, for example, according to an instruction from the remote commander 14. Furthermore, the image processing apparatus 13 supplies to the display device 15 image data corresponding to an image that is to be displayed on the display device 15 (hereinafter referred to as display data when appropriate).

The remote commander 14 is operated by a user, and sends an operation signal corresponding to the user's operation to the image playback apparatus 12 or the image processing apparatus 13 by wireless, for example, using infrared rays.

The display device 15 is, for example, a liquid crystal panel or cathode-ray-tube (CRT) display. The display device 15 displays an image corresponding to display data supplied from the image processing apparatus 13.

In the image processing system configured as described above, for example, according to an instruction from the remote commander 14, the image playback apparatus 12 plays back image data from the recording medium 11 and supplies the image data to the image processing apparatus 13.

The image processing apparatus 13 extracts a feature from the image data supplied from the image playback apparatus 12, and supplies the image data or the feature as display data to the display device 15 for display.

If, for example, the user performs an editing operation using the remote commander 14 to instruct a zoom, pan, tilt, or the like, the remote commander 14 sends an operation signal corresponding to the editing operation to the image processing apparatus 13.

Upon receiving the operation signal corresponding to the editing operation from the remote commander 14, according to the operation signal, the image processing apparatus 13 determines processing that is to be executed on the image data supplied from the image playback apparatus 12 (hereinafter referred to as editing processing when appropriate). Then, the image processing apparatus 13 records processing information representing the editing processing in association with the feature of the image data on which the editing processing represented by the processing information is to be executed.

After the processing information is recorded in association with the feature in the image processing apparatus 13 as described above, when the image playback apparatus 12 plays back image data from the recording medium 11 and supplies the image data to the image processing apparatus 13, for example, according to another instruction or the like issued from the remote commander 14, the image processing apparatus 13 extracts a feature from the image data supplied from the image playback apparatus 12.

Furthermore, the image processing apparatus 13 detects a feature having a value matching the feature extracted from the image data among features recorded in association with processing information, and executes editing processing represented by processing information associated with the feature on the image data supplied from the image playback apparatus 12. Then, the image processing apparatus 13 supplies the image data on which the editing processing has been executed to the display device 15 as display data so that a corresponding image is displayed.

As described above, after processing information representing editing processing that is executed on image data recorded on the recording medium 11 has been recorded in the image processing apparatus 13, without recording the image data on which the editing processing has been executed (hereinafter referred to as edited image data when appropriate), the edited image data can be played back repeatedly.

Thus, it is possible to execute non-linear editing on the image data recorded on the recording medium 11 without time codes.

Furthermore, even if image data recorded on the recording medium 11 represents content under copy restriction, such as "No More Copy", it is possible to repeatedly play back edited image data obtained by executing the same editing processing on the image data.

Hereinafter, an image corresponding to image data itself recorded on the recording medium 11 and an image corresponding to edited image data obtained by executing editing processing on the image data will be referred to as content images when appropriate.

Figure 2:
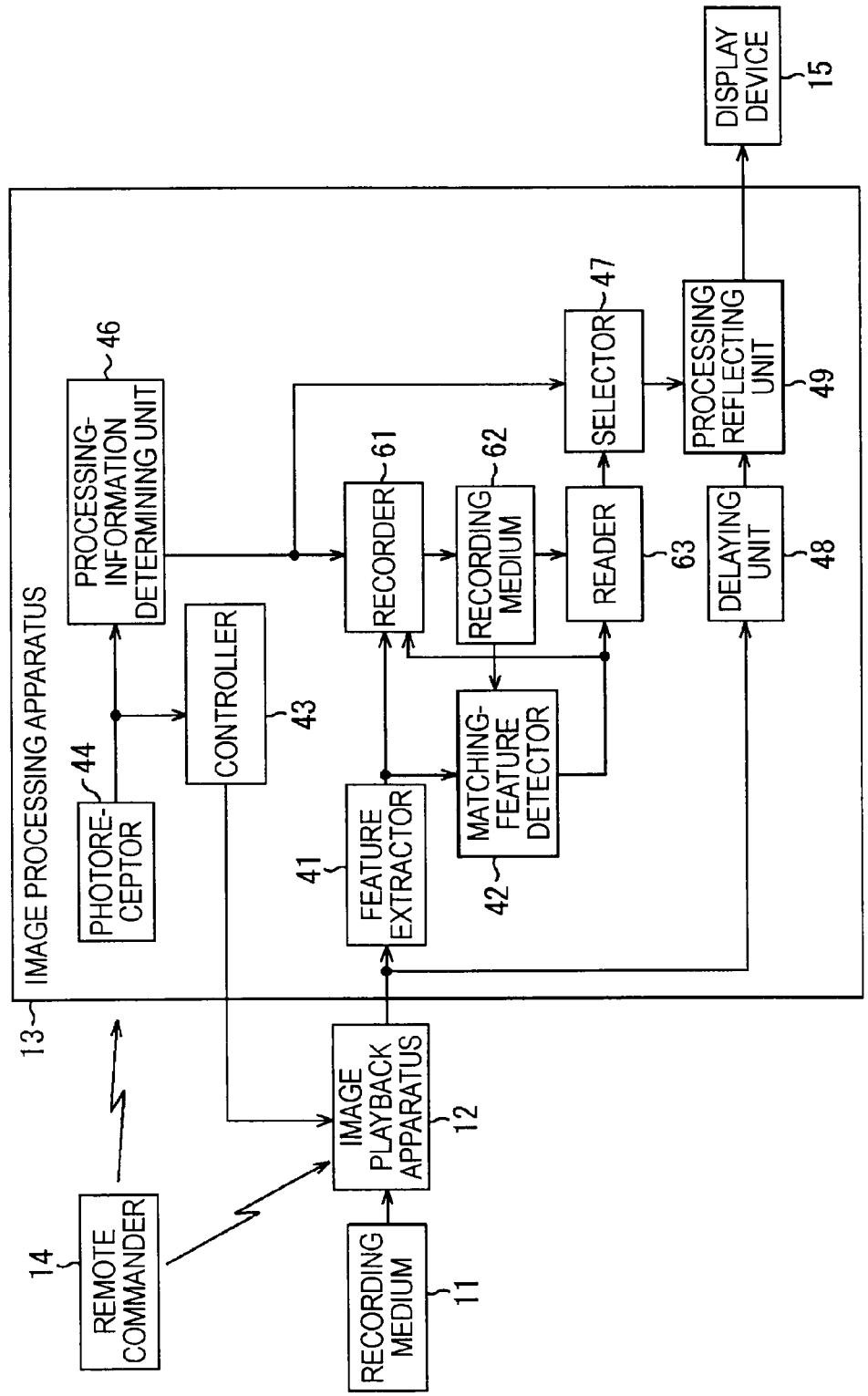
FIG. 2 is a block diagram showing a first example configuration of an image processing apparatus.

FIG. 2 is a block diagram showing a first example configuration of the image processing apparatus 13 shown in FIG. 1.

Referring to FIG. 2, the image processing apparatus 13 includes a feature extractor 41, a matching-feature detector 42, a controller 43, a photoreceptor 44, a processing-information determining unit 46, a selector 47, a delaying unit 48, a processing reflecting unit 49, a recorder 61, a recording medium 62, and a reader 63.

The feature extractor 41 receives image data from the image playback apparatus 12. The feature extractor 41 extracts specific features from individual frames (or fields) of image data sequentially supplied from the image playback apparatus 12, and supplies the features to the matching-feature detector 42 and the recorder 61 on a frame-by-frame basis.

As the features extracted from the image data by the feature extractor 41, information that can serve to distinguish individual frames of image data recorded on the recording medium 11 can be used. As the information that can serve to distinguish individual frames of image data, for example, the sum of pixel values of pixels in the entirety or a partial region of an effective image area of a frame of image data, a partial bit sequence of the sum, such as the low-order 8 bits, or the like may be used.

The matching-feature detector 42 detects a feature that matches a feature of image data played back by the image playback apparatus 12, supplied from the feature extractor 41, from features recorded on the recording medium 62 (The feature detected by the matching-feature detector 42 will hereinafter be referred to as a matching feature when appropriate). When the matching-feature detector 42 has succeeded in detecting a matching feature, the matching-feature detector 42 supplies the matching feature to the recorder 61 and the reader 63.

The controller 43 controls component blocks of the image playback apparatus 12 or the image processing apparatus 13 as needed according to operation signals supplied from the photoreceptor 44.

The photoreceptor 44 receives an infrared ray sent from the remote commander 14 as an operation signal and photoelectrically converts the infrared ray, and supplies the resulting operation signal in the form of an electric signal to the controller 43 and the processing-information determining unit 46.

According to the operation signal supplied from the photoreceptor 44, the processing-information determining unit 46 determines (recognizes) editing processing that is to be executed on the image data supplied from the image playback apparatus 12, and supplies processing information representing the editing processing to the selector 47 and the recorder 61.

The selector 47 receives processing information from the processing-information determining unit 46 and also receives processing information from the reader 63. When processing information is supplied from the processing-information determining unit 46, the selector 47 supplies the processing information to the processing reflecting unit 49. On the other hand, when no processing information is supplied from the processing-information determining unit 46 and processing information is supplied from the reader 63, the selector 47 supplies the processing information to the processing reflecting unit 49. When processing information is not supplied either from the processing-information determining unit 46 or the reader 63, the selector 47 does not supply any processing information to the processing reflecting unit 49.

The delaying unit 48 receives image data from the image playback apparatus 12, which is the same image data as the image data supplied to the feature extractor 41. The delaying unit 48 temporarily stores the image data supplied from the image playback apparatus 12 in accordance with a time taken for processing by the feature extractor 41, the matching-feature detector 42, the selector 47, the recorder 61, and the reader 63, thereby delaying the image data as needed, and supplies the delayed image data to the processing reflecting unit 49.

The processing reflecting unit 49 executes editing processing represented by the processing information supplied from the selector 47 on the image data supplied from the delaying unit 48, and supplies the resulting edited image data to the display device 15 as display data.

When no processing information is supplied from the selector 47 to the processing reflecting unit 49, the processing reflecting unit 49 supplies the image data supplied from the delaying unit 48 to the display device 15 as it is as display data.

The recorder 61 records the feature supplied from the feature extractor 41 on the recording medium 62. Furthermore, the recorder 61 records on the recording medium 62 the processing information supplied from the processing-information determining unit 46 in association with the feature.

The recording medium 62 is, for example, a disk recording medium or a semiconductor memory, and processing information and features are recorded thereon. The recording medium 62 may be either a medium provided internally in the image processing apparatus 13 or a medium that can be attached to or detached from the image processing apparatus 13.

The reader 63 reads from the recording medium 62 processing information associated with the matching feature supplied from the matching-feature detector 42, and supplies the processing information to the selector 47.

Figure 3:
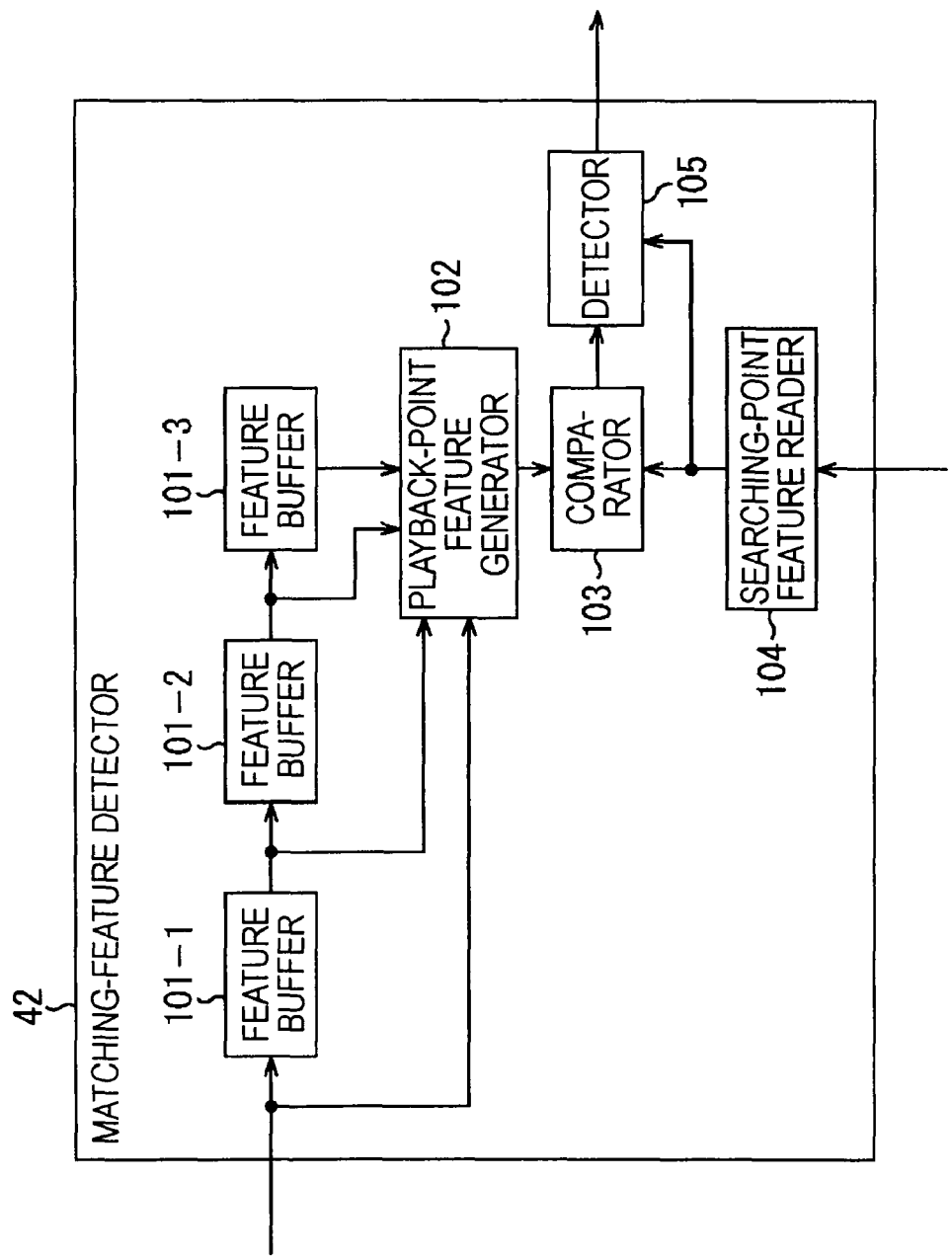
FIG. 3 is a block diagram showing an example configuration of a matching-feature detector.

FIG. 3 is a diagram showing an example configuration of the matching-feature detector 42 shown in FIG. 2.

Referring to FIG. 3, the matching-feature detector 42 includes three feature buffers 101-1 to 101-3, a playback-point feature generator 102, a comparator 103, a searching-point feature reader 104, and a detector 105.

As described with reference to FIG. 2, the matching-feature detector 42 receives features extracted from image data by the feature extractor 41 on a frame-by-frame basis.

The feature buffer 101-1 latches a feature supplied from the feature extractor 41, and supplies the feature to the subsequent feature buffer 101-2 and the playback-point feature generator 102. The feature buffer 101-2 latches the feature supplied from the feature buffer 101-1, and supplies the feature to the subsequent feature buffer 101-3 and the playback-point feature generator 102. The feature buffer 101-3 latches the feature supplied from the feature buffer 101-2, and supplies the feature to the playback-point feature generator 102.

Upon receiving a feature from the feature extractor 41 (FIG. 2), the playback-point feature generator 102 generates a sequence of features of four frames, in which the feature received and the features latched individually by the feature buffers 101-1 to 101-3 are arranged in order of time, and supplies the feature sequence to the comparator 103.

The feature buffers 101-1 to 101-3 execute latching at timing of supply of a feature of a new frame from the feature extractor 41 (FIG. 2) to the matching-feature detector 42. Thus, for example, when a feature of the N-th frame is supplied from the feature extractor 41 to the matching-feature detector 42, a feature of the (N−1)-th frame is latched in the feature buffer 101-1, a feature of the (N−2)-th frame is latched in the feature buffer 101-2, and a feature of the (N−3)-th frame is latched in the feature buffer 101-3. Thus, the playback-point feature generator 102 generates a sequence of features of four successive frames from the (N−3)-th frame to the N-th frame.

The feature sequence generated by the playback-point feature generator 102 will hereinafter be referred to as a playback-point feature when appropriate.

The comparator 103 compares the sequence of features of four successive frames, supplied from the playback-point feature generator 102 as a playback-point feature, with a sequence of features of four successive frames, supplied from the searching-point feature reader 104 as a searching-point feature as will be described later, and supplies the result of comparison to the detector 105.

The searching-point feature reader 104 sequentially reads features of four successive frames from the features recorded on the recording medium 62, while shifting through the features by one frame each time. Furthermore, the searching-point feature reader 104 generates a sequence of features of four frames, in which the features of four successive frames read from the recording medium 62 are arranged in order of time, and supplies the feature sequence to the comparator 103 and the detector 105 as a searching-point feature.

On the basis of the result of comparison supplied from the comparator 103, the detector 105 determines (detects) whether the feature sequence of four successive frames serving as the playback-point feature matches the feature sequence of four successive frames serving as the searching-point feature. If these feature sequences match, the detector 105 supplies the searching-point feature supplied from the searching-point feature reader 104 to the recorder 61 and the reader 63 (FIG. 2).

Of the feature sequence of four successive frames, supplied from the detector 105 to the recorder 61 and the reader 63 as the searching-point feature, for example, the feature of the latest frame (the last frame in time) serves as the matching feature described earlier.

In the matching-feature detector 42 configured as described above, a matching-feature detecting process is executed to detect a matching feature having a value matching the feature extracted by the feature extractor 41 from the features recorded on the recording medium 62.

Now, the matching-feature detecting process executed by the matching-feature detector 42 shown in FIG. 3 will be described with reference to FIG. 4.

The matching-feature detector 42 receives features extracted from image data by the feature extractor 41 (FIG. 2) on a frame-by-frame basis. In the matching-feature detector 42, each feature supplied from the feature extractor 41 is supplied to the playback-point feature generator 102, and is latched sequentially by the feature buffers 101-1 to 101-3.

The playback-point feature generator 102 generates a sequence of features of four frames as a playback-point feature G2, in which the feature supplied from the feature extractor 41 and the features latched individually by the feature buffers 101-1 to 101-3 are arranged, and supplies the playback-point feature G2 to the comparator 103.

The searching-point feature reader 104 reads the features of four successive frames starting from the feature of the first frame among the features of frames recorded on the recording medium 62 (FIG. 2), generates a feature sequence of four frames in which the features of four frames are arranged as a searching-point feature, and supplies the searching-point feature to the comparator 103 and the detector 105.

The comparator 103 compares the feature sequence of four successive frames supplied from the playback-point feature generator 102 as the playback-point feature with the feature sequence of four successive frames supplied from the searching-point feature reader 104 as the playback-point feature G2, and supplies the result of comparison to the detector 105.

On the basis of the result of comparison supplied from the comparator 103, the detector 105 determines whether the feature sequence of four successive frames serving as the playback-point feature G2 matches the feature sequence of four successive frames serving as the searching-point feature.

If the playback-point feature does not match the searching-point feature, the searching-point feature reader 104 reads the features of four successive frames starting from the feature of a frame that is shifted by one frame in the direction of the future (the temporally succeeding direction) relative to the features of four successive frames read from the recording medium 62 (FIG. 2) as the searching-point feature in the preceding iteration. Then, the searching-point feature reader 104 generates a sequence of features of four frames in which the features of the four frames are arranged as a new searching-point feature, and supplies the new searching-point feature to the comparator 103 and the detector 105.

The comparator 103 compares the playback-point feature G2 supplied from the playback-point feature generator 102 with the new searching-point feature supplied from the searching-point feature reader 104. Then, the subsequent processing steps are repeated similarly.

Figure 4:
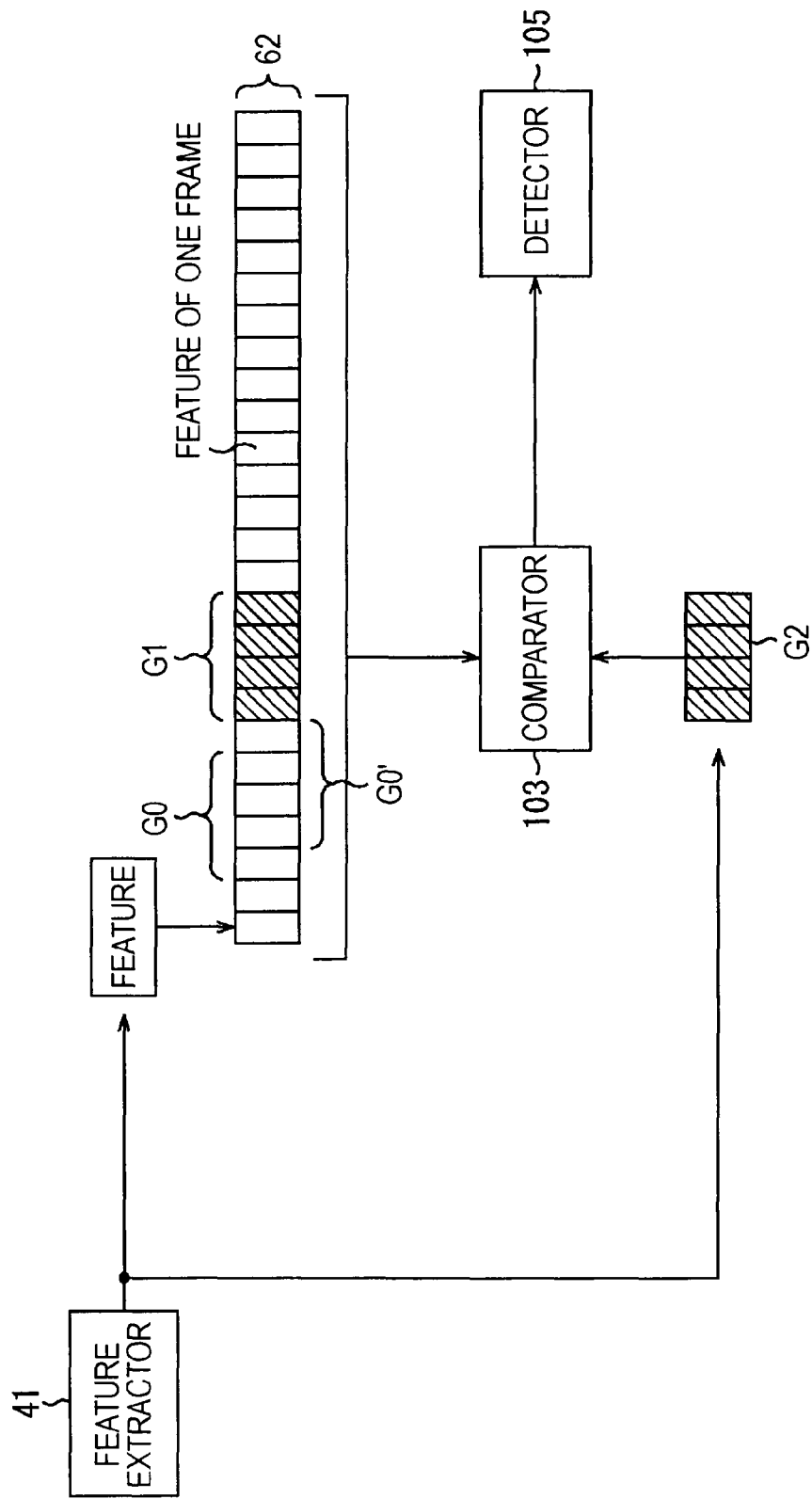
FIG. 4 is a diagram for explaining a matching-feature detecting process executed by the matching-feature detector.

For example, as shown in FIG. 4, the comparator 103 compares the feature sequence of four successive frames serving as the playback-point feature G2 with the feature sequence of four successive frames serving as a searching-point feature G0, and supplies the result of comparison to the detector 105.

If the playback-point feature G2 does not match the searching-point feature G0, the searching-point feature reader 104 generates a sequence of features of four successive frames starting from the feature of a frame that is shifted by one frame in the direction of the future relative to the features of four successive frames serving as the searching-point feature G0, which serves as a new searching-point feature G0'. Furthermore, the comparator 103 compares the new searching-point feature G0' with the playback-point feature G2. Then, the comparator 103 similarly repeats comparison with the playback-point feature G2.

Then, if a searching-point feature G1 newly generated by the searching-point feature reader 104 matches the playback-point feature G2 and the result of comparison between the searching-point feature G1 and the playback-point feature G2 is supplied from the comparator 103 to the detector 105, the detector 105 determines that the feature sequence of four successive frames supplied from the playback-point feature generator 102 as the playback-point feature G2 matches the feature sequence of four successive frames supplied from the searching-point feature reader 104 as the searching-point feature G1. Then, the detector 105 supplies the searching-point feature G1 supplied from the searching-point feature reader 104 to the recorder 61 and the reader 63 (FIG. 2).

Let it be considered that a frame of image data played back from the recording medium 11 in the image playback apparatus 12 (FIG. 2) and supplied to the feature extractor 41 and the delaying unit 48 of the image processing apparatus 13 serves as a subject frame. Through the process described above, a feature having a value matching the feature extracted from the subject frame by the feature extractor 41 (matching feature), i.e., a feature extracted from the subject frame when the subject frame was processed in the past in the image processing apparatus 13, can be detected from the features recorded on the recording medium 62.

More specifically, the last feature in the feature sequence of four successive frames serving as the searching-point feature matching the playback-point feature is the matching feature having a value matching the feature of the subject frame, i.e., the feature extracted from the subject frame when the subject frame was processed in the past in the image processing apparatus 13.

In the case described above, each of the playback-point feature and the searching-point feature is composed of a sequence of features of four successive frames. Alternatively, each of the playback-point feature and the searching-point feature may be composed of, for example, a sequence of features of a number of successive frames other than four successive frames, a sequence of features of a number of non-successive frames, such as every other frame, or the like.

Next, an operation of the image processing apparatus 13 shown in FIG. 2 will be described with reference to flowcharts shown in FIGS. 5 and 6.

In the image processing apparatus 13 shown in FIG. 2, a feature recording process of extracting features from individual frames of image data recorded on the recording medium 11 and recording the features, an editing/playback process of editing image data recorded on the recording medium 11 and playing back the edited image data, and so forth are executed.

The image processing apparatus 13 has two operation modes, namely, a normal playback mode and an editing mode. For example, the feature recording process is executed when the image processing apparatus 13 is in the normal playback mode, and the editing/playback process is executed when the image processing apparatus 13 is in the editing mode.

In the normal playback mode, when the remote commander 14 is operated to perform playback, the image processing apparatus 13 supplies image data supplied from the image playback apparatus 12 as it is to the display device 15 as display data.

In the editing mode, when the remote commander 14 is operated to perform editing, the image processing apparatus 13 executes editing processing corresponding to the editing operation on image data supplied from the image playback apparatus 12, and supplies edited image data obtained through the editing processing to the display device 15 as display data. Furthermore, the image processing apparatus 13 records processing information representing the editing processing corresponding to the editing operation on the recording medium 62. Furthermore, in the editing mode, editing processing represented by processing information recorded on the recording medium 62 in the past is executed on image data supplied from the image playback apparatus 12, and the resulting edited image data is supplied to the display device 15 as display data.

The operation mode can be switched by operating the remote commander 14.

First, the feature recording process executed by the image processing apparatus 13 shown in FIG. 2 will be described with reference to a flowchart shown in FIG. 5.

For example, when the user checks an image corresponding to image data recorded on the recording medium 11 to make an overall plan of editing before actually editing the image data, the user selects the normal playback mode as the operation mode and operates the remote commander 14 to instruct playback.

In this case, the remote commander 14 sends an operation signal corresponding to the playback instruction operation by the user, and the operation signal is received by the photoreceptor 44 and supplied to the controller 43. Upon receiving the operation signal corresponding to the playback instruction operation from the photoreceptor 44 when the operation mode is the normal playback mode, in step S11, the controller 43 sends a playback command for requesting playback to the image playback apparatus 12. Then, the image playback apparatus 12 starts playback of image data recorded on the recording medium 11.

Upon starting playback of image data, the image playback apparatus 12 supplies the image data to the image processing apparatus 13. In the image processing apparatus 13, the image data supplied from the image playback apparatus 12 is supplied to the feature extractor 41 and the delaying unit 48 on a frame-by-frame basis.

The image data supplied to the delaying unit 48 is supplied to the processing reflecting unit 49. In the processing reflecting unit 49, the image data supplied from the delaying unit 48 is supplied as it is to the display device 15 as display data. Thus, the display device 15 displays an image corresponding to the image data itself recorded on the recording medium 11, so that the user can check on the display device 15 the image corresponding to the image data recorded on the recording medium 11.

The process then proceeds from step S11 to step S12. In step S12, the feature extractor 41 executes a feature extracting process of extracting features from frames of the image data supplied from the image playback apparatus 12. The process then proceeds to step S13. The features obtained through the feature extracting process executed by the feature extractor 41 in step S12 are supplied to the recorder 61.

In step S13, the recorder 61 records the features supplied from the feature extractor 41 on the recording medium 62. The process then proceeds from step S13 to step S14.

The recorder 61 records the features on the recording medium 62 in such a manner that the order of frames at the time of extraction of features is maintained. That is, when a feature recorded on the recording medium 62 is a feature of the N-th frame of image data recorded on the recording medium 11, the feature of the (N+1)-th frame (or the (N−1)-th frame) is recorded on the recording medium 62 in such a manner that it can be recognized that the feature of the (N+1)-th frame (or the (N−1)-th frame) is the feature of a frame immediately succeeding (or preceding) the feature of the N-th frame that has already been recorded.

In step S14, the controller 43 determines whether playback of all the image data recorded on the recording medium 11 has been finished. If it is determined in step S14 that playback of all the image data recorded on the recording medium 11 has not been finished, i.e., if playback of the image data is still going on in the image playback apparatus 12, the process returns to step S12, and the subsequent processing steps are repeated similarly on the next frame of image data supplied from the image playback apparatus 12.

On the other hand, if it is determined in step S14 that playback of all the image data recorded on the recording medium 11 has been finished, i.e., if playback of image data has been finished in the image playback apparatus 12, the feature recording process comes to an end.

The features need not be recorded on the recording medium 62 in duplicates. For example, when the feature recording process has been executed previously so that the features of image data recorded on the recording medium 11 have already been recorded on the recording medium 62, the feature recording process need not be executed again for the image data recorded on the recording medium 11.

Next, the editing/playback process executed by the image processing apparatus 13 shown in FIG. 2 will be described with reference to a flowchart shown in FIG. 6.

As described earlier, when image data recorded on the recording medium 11 is played back in the normal playback mode, and the user checks an image corresponding to the image data recorded on the recording medium 11 to make an overall plan of editing and then edits the image data, the user selects the editing mode as the operation mode and operates the remote commander 14 to instruct playback.

In this case, the remote commander 14 sends an operation signal corresponding to the playback instruction operation by the user, and the operation signal is received by the photoreceptor 44 and supplied to the controller 43. Upon receiving the operation signal corresponding to the playback instruction operation from the photoreceptor 44 when the operation mode is the editing mode, the controller 43 sends a playback command for requesting playback to the image playback apparatus 12. Then, the image playback apparatus 12 starts playback of image data recorded on the recording medium 11.

Upon starting playback of image data, the image playback apparatus 12 supplies the image data to the image processing apparatus 13. In the image processing apparatus 13, the image data supplied from the image playback apparatus 12 is supplied to the feature extractor 41 and the delaying unit 48 on a frame-by-frame basis.

Then, in the image processing apparatus 13, in step S21, the delaying unit 48 determines whether image data of one frame has been supplied from the image playback apparatus 12. If it is determined in step S21 that image data of one frame has not been supplied, the process proceeds to step S30.

On the other hand, if it is determined in step S21 that image data of one frame has been supplied, i.e., if image data played back from the recording medium 11 in the image playback apparatus 12 has been supplied to the feature extractor 41 and the delaying unit 48, the process proceeds to step S22. In step S22, the delaying unit 48 temporarily stores the image data of one frame supplied from the image playback apparatus 12 so that the image data is delayed, for example, by a period corresponding to one frame.

Then, the process proceeds from step S22 to step S23. In step S23, the feature extractor 41 executes a feature extracting process of extracting a feature from the image data, thereby extracting a feature from a subject frame, i.e., the frame of image data supplied from the image playback apparatus 12. That is, when the delaying unit 48 temporarily stores the image data of the subject frame supplied from the image playback apparatus 12 to delay the image data, the image data of the subject frame is also supplied to the feature extractor 41, so that the image data of the subject frame is temporarily stored for delaying on one hand and a feature is extracted therefrom on the other hand at the same time.

The feature extractor 41 supplies the feature extracted from the image data of the subject frame to the matching-feature detector 42 and the recorder 61. The process then proceeds from step S23 to step S24.

In step S24, the matching-feature detector 42 executes the matching-feature detecting process described with reference to FIG. 4.

More specifically, as described with reference to FIG. 4, the matching-feature detector 42 generates a playback-point feature including the feature of the subject frame supplied from the feature extractor 41 (the feature extracted from the image data of the subject frame). Furthermore, the matching-feature detector 42 generates searching-point features each composed of a sequence of features of four frames among the features recorded on the recording medium 62 while shifting through the features by one frame each time, and sequentially compares the searching-point features with the playback-point feature.

Upon detecting a searching-point feature matching the playback-point feature, the matching-feature detector 42 supplies the searching-point feature matching the playback-point feature to the recorder 61 and the reader 63.

After the matching-feature detecting process in step S24, the process proceeds to step S25. In step S25, the reader 63 determines whether a searching-point feature matching the playback-point feature has been detected, i.e., whether a feature having a value matching the feature of the subject frame included in the playback-point feature has been detected from the features recorded on the recording medium 62.

If it is determined in step S25 that a matching feature having a value matching the feature of the subject frame included in the playback-point feature has not been detected from the features recorded on the recording medium 62, i.e., if no searching-point feature matching the playback-point feature has been detected in the matching-feature detecting process in step S24 so that no searching-point feature is supplied from the matching-feature detector 42 to the recorder 61 or the reader 63, the process proceeds to step S33. In step S33, the processing reflecting unit 49 supplies the image data of the subject frame stored in the delaying unit 48 as it is to the display device 15 as display data. The process then proceeds to step S30.

Thus, if no searching-point feature matching the playback-point feature including the feature of the subject frame is recorded on the recording medium 62, an image corresponding to the image data itself of the subject frame played back from the recording medium 11 is displayed.

If it is determined in step S25 that a matching feature having a value matching the feature of the subject frame included in the playback-point feature has been detected from the features recorded on the recording medium 62, i.e., if a searching-point feature matching the playback-point feature has been detected in the matching-feature detecting process in step S24 and the searching-point feature has been supplied from the matching-feature detector 42 to the recorder 61 and the reader 63, the process proceeds to step S26. In step S26, the processing-information determining unit 46 determines whether an editing operation has been performed by the user using the remote commander 14.

If it is determined in step S26 that an editing operation has been performed, i.e., for example, if the user has performed an editing operation using the remote commander 14 to execute editing such as ×2 zoom-up while viewing an image displayed on the display device 15, and an operation signal corresponding to the editing operation has been received by the photoreceptor 44 and supplied to the processing-information determining unit 46, the process proceeds to step S27. In step S27, on the basis of the operation signal supplied from the photoreceptor 44, the processing-information determining unit 46 determines editing processing that is to be executed on the image data of the subject frame, and supplies processing information representing the editing processing to the selector 47 and the recorder 61. The process then proceeds to step S28.

In step S28, the recorder 61 detects a feature sequence of four frames serving as the searching-point feature supplied from the matching-feature detector 42 from the features recorded on the recording medium 62, and records the processing information supplied from the processing-information determining unit 46 on the recording medium 62 in association with a matching feature having a value matching the feature that is temporally latest among the features, i.e., the feature of the subject frame. The process then proceeds to step S29.

That is, when an editing operation has been performed while the image data of the subject frame is being played back, processing information representing editing processing corresponding to the editing operation is recorded on the recording medium 62 in association with the feature of the image data of the subject frame on which the editing processing is to be executed.

In step S29, the selector 47 selects the processing information supplied from the processing-information determining unit 46 in immediately preceding step S27, and supplies the processing information to the processing reflecting unit 49. The processing reflecting unit 49 executes the editing processing represented by the processing information supplied from the selector 47 on the image data of the subject frame stored in the delaying unit 48. That is, in this case, the processing reflecting unit 49 executes editing processing corresponding to the editing operation by the user, and supplies the resulting edited image data to the display device 15 as display data. The process then proceeds to step S30.

Thus, when the editing operation has been performed, processing information representing editing processing corresponding to the editing operation is recorded on the recording medium 62 in association with the feature of the image data of the subject frame on which the editing processing is to be executed, and the display device 15 displays an image corresponding to edited image data obtained by executing the editing processing corresponding to the editing operation on the image data of the subject frame.

If it is determined in step S26 that no editing operation has been performed, the process proceeds to step S31. In step S31, the reader 63 determines whether processing information associated with a matching feature having a value matching the feature of the subject frame is recorded on the recording medium 62.

That is, in step S31, the reader 63 detects a sequence of features of four frames serving as the searching-point feature supplied from the matching-feature detector 42 from the features recorded on the recording medium 62, and determines whether processing information is recorded on the recording medium 62 in association with a matching feature having a value matching the feature that is temporally latest, i.e., the feature of the subject frame.

If it is determined in step S31 processing information associated with a matching feature having a value matching the feature of the subject frame is not recorded, i.e., if no editing operation has been performed before on the subject frame that is being played back so that no processing information is recorded on the recording medium 62 in association with a matching feature (a feature that has been extracted before from the subject frame) having a value matching the temporally latest feature in the feature sequence of four frames serving as the searching-point feature supplied from the matching-feature detector 42, i.e., the feature of the subject frame, the process proceeds to step S33. As described earlier, in step S33, the processing reflecting unit 49 supplies the image data of the subject frame stored in the delaying unit 48 as it is to the display device 15 as display data. The process then proceeds to step S30.

Thus, if no processing operation has been performed and no processing information is recorded on the recording medium 62 in association with a matching feature having a value matching the feature of the subject frame, i.e., in association with the feature of the subject frame, the display device 15 displays an image corresponding to the image data itself of the subject frame played back from the recording medium 11.

If it is determined in step S31 that processing information associated with a matching feature having a value matching the feature of the subject frame is recorded, i.e., if an editing operation has been performed before on the subject frame when the subject frame was played back so that processing information is recorded on the recording medium 62 in association with a matching feature having a value matching the temporally latest feature in the feature sequence of four frames as the searching-point feature supplied from the matching-feature detector 42, i.e., the feature of the subject frame, the process proceeds to step S32. In step S32, the reader 63 reads the processing information associated with the matching feature, i.e., the feature of the subject frame, and supplies the processing information to the selector 47. The process then proceeds to step S29.

In step S29, the selector 47 selects processing information supplied from the reader 63 in immediately preceding step S32, and supplies the processing information to the processing reflecting unit 49. That is, in this case, since no editing operation has been performed, no processing information is supplied from the processing-information determining unit 46 and processing information is supplied only from the reader 63 to the selector 47, so that the selector 47 selects the processing information supplied in immediately preceding step S32 and supplies the processing information to the processing reflecting unit 49.

The processing reflecting unit 49 executes the editing processing represented by the processing information supplied from the selector 47 on the image data of the subject frame stored in the delaying unit 48. That is, in this case, the processing reflecting unit 49 executes the editing processing represented by the processing information recorded on the recording medium 62 in association with the feature of the subject frame, and supplies the resulting edited image data to the display device 15 as display data. The process then proceeds to step S30.

Thus, if no editing operation has been performed in the current editing/playback process but an editing operation was performed before when the subject frame was played back so that processing information representing editing processing corresponding to the editing operation performed before is recorded on the recording medium 62 in association with the feature of the subject frame, the display device 15 displays an image corresponding to edited image data obtained by executing the editing processing corresponding to the editing operation performed before on the image data of the subject frame.

In step S30, the controller 43 determines whether playback by the image playback apparatus 12 of all the image data recorded on the recording medium 11 has been finished or the remote commander 14 has been operated to finish playback.

If it is determined in step S30 that playback of all the image data recorded on the recording medium 11 has not been finished and the remote commander 14 has not been operated to finish playback, the process returns to step S21, in which it is checked whether image data of a next frame has been supplied from the image playback apparatus 12. Then, the subsequent processing steps are repeated.

On the other hand, if it is determined in step S30 that playback of all the image data recorded on the recording medium 11 has been finished or the remote commander 14 has been operated to finish playback, the editing/playback process is exited.

Figure 5:
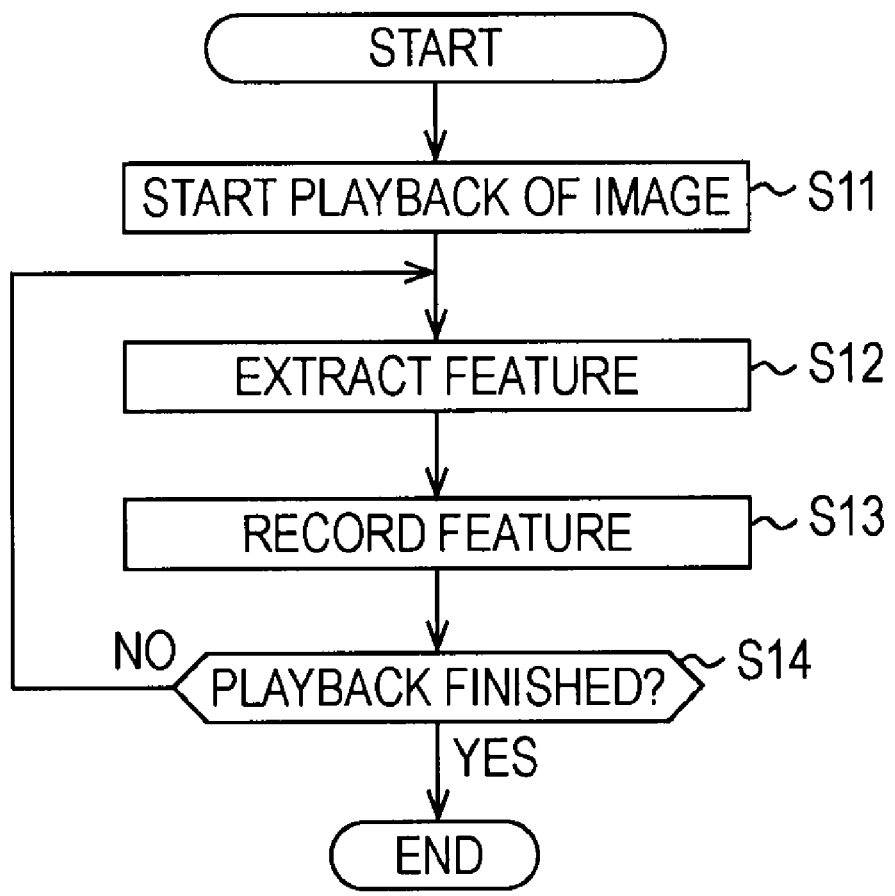
FIG. 5 is a flowchart of a feature recording process.

The features may be recorded, for example, immediately after the feature extracting process in step S23 of the editing/playback process (FIG. 6) as well as in the feature recording process (FIG. 5).

Next, the editing/playback process executed by the image processing apparatus 13 shown in FIG. 2 will be described further. In the following description, it is assumed that the feature recording process (FIG. 5) has already been finished.

Figure 7:
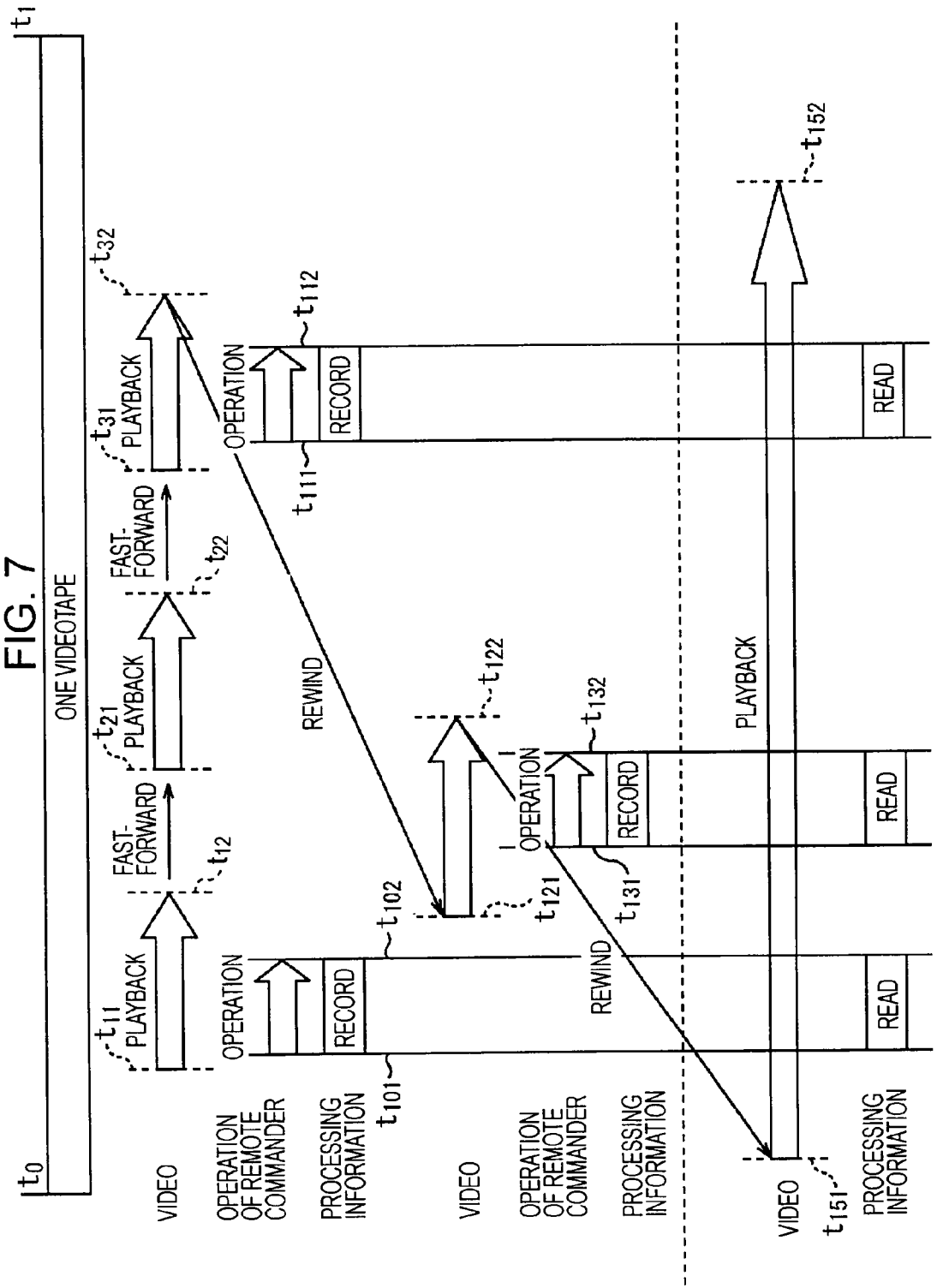
FIG. 7 is a diagram for explaining the editing/playback process.

Referring to FIG. 7, the recording medium 11 has recorded thereon image data having a playback period from time $t_0$ to time $t_1$, and playback of image data is started from time $t_{11}$, which is later than time $t_0$.

For example, if the user performs an editing operation using the remote commander 14 between time $t_{101}$ and time $t_{102}$, which are later than time $t_{11}$, processing information representing editing processing corresponding to the editing operation is recorded on the recording medium 62 in association with a feature of image data between time $t_{101}$ and time $t_{102}$.

Then, referring to FIG. 7, at time $t_{12}$, fast-forwarding is started, and playback is performed again between time $t_{21}$ and time $t_{22}$. Then, fast-forwarding is performed up to time $t_{31}$, and playback is started at time $t_{31}$.

For example, when the user performs an editing operation using the remote commander 14 between time $t_{111}$ and time $t_{112}$ after the start of playback from time $t_{31}$, processing information representing editing processing corresponding to the editing operation is recorded on the recording medium 62 in association with a feature of image data between time $t_{111}$ and time $t_{112}$.

Referring to FIG. 7, playback is continued up to time $t_{32}$, and rewinding is performed up to time $t_{121}$, and playback is started again.

For example, when the user performs an editing operation using the remote commander 14 between time $t_{131}$ and time $t_{132}$ during playback started at time $t_{121}$, processing information representing editing processing corresponding to the editing operation is recorded on the recording medium 62 in association with a feature of image data between time $t_{131}$ and time $t_{132}$.

Referring to FIG. 7, playback is continued up to time $t_{132}$, rewinding is performed up to time $t_{151}$, which is close to time $t_0$ at the beginning, and playback is performed again up to time $t_{152}$, which is close to time $t_1$ at the end.

In this case, when image data between time $t_{101}$ and time $t_{102}$, between time $t_{131}$ and time $t_{132}$, and time $t_{111}$ and time $t_{112}$, in which editing operations were performed using the remote commander 14, is played back, processing information associated with a feature of image data of the period is read from the recording medium 62, and editing processing represented by the processing information is executed on image data whose feature is associated with the processing information.

As described above, in the image processing apparatus 13, editing processing that is to be executed on image data of a subject frame is determined on the basis of an editing operation, and processing information representing the editing processing is recorded on the recording medium 62 in association with a feature of image data on which the editing processing represented by the processing information is to be executed, i.e., a feature of a subject frame. Thus, by detecting a matching feature having a value matching the feature of the subject frame among features recorded on the recording medium 62 and executing editing processing represented by processing information associated with the matching feature, it is possible to execute editing processing corresponding to an editing operation performed before on the subject frame.

That is, editing processing that is to be executed on a subject frame can be identified on the basis of processing information associated with the feature of the subject frame and executed on the subject frame.

Thus, without recording edited image data obtained by executing editing processing on image data recorded on the recording medium 11, it is possible to reproduce the edited image data. Furthermore, it is possible to edit an image without using time codes.

As the feature associated with processing information, the sum of pixel values in one frame is used. Alternatively, other values may be used, such as a motion vector (global motion and local motion), a value representing the frequency of occurrence of a specific waveform pattern, the sum of pixel values in a thumbnail image, a sum of pixel values in a specific part of image, a value obtained on the basis of one of these values throughout a plurality of frames, or a combination of a plurality of features described above.

That is, the feature associated with the processing information may be any information that can serve to identify a frame on which editing processing represented by the processing information is to be executed, and may be information that takes on different values for different images or that takes on different values for different images at a high probability.

An example of feature that takes on different values for different images at a high probability is low-order 8 bits of the sum of pixel values in one frame. Even with such a feature, it is possible to accurately detect a feature of the subject frame (matching feature) from the features recorded on the recording medium 62 by comparing feature sequences of a plurality of frames such as four frames with each other (a playback-point feature and a searching-point feature) as described with reference to FIG. 4.

The feature associated with processing information will hereinafter be referred to as a processing feature when appropriate.

Figure 8:
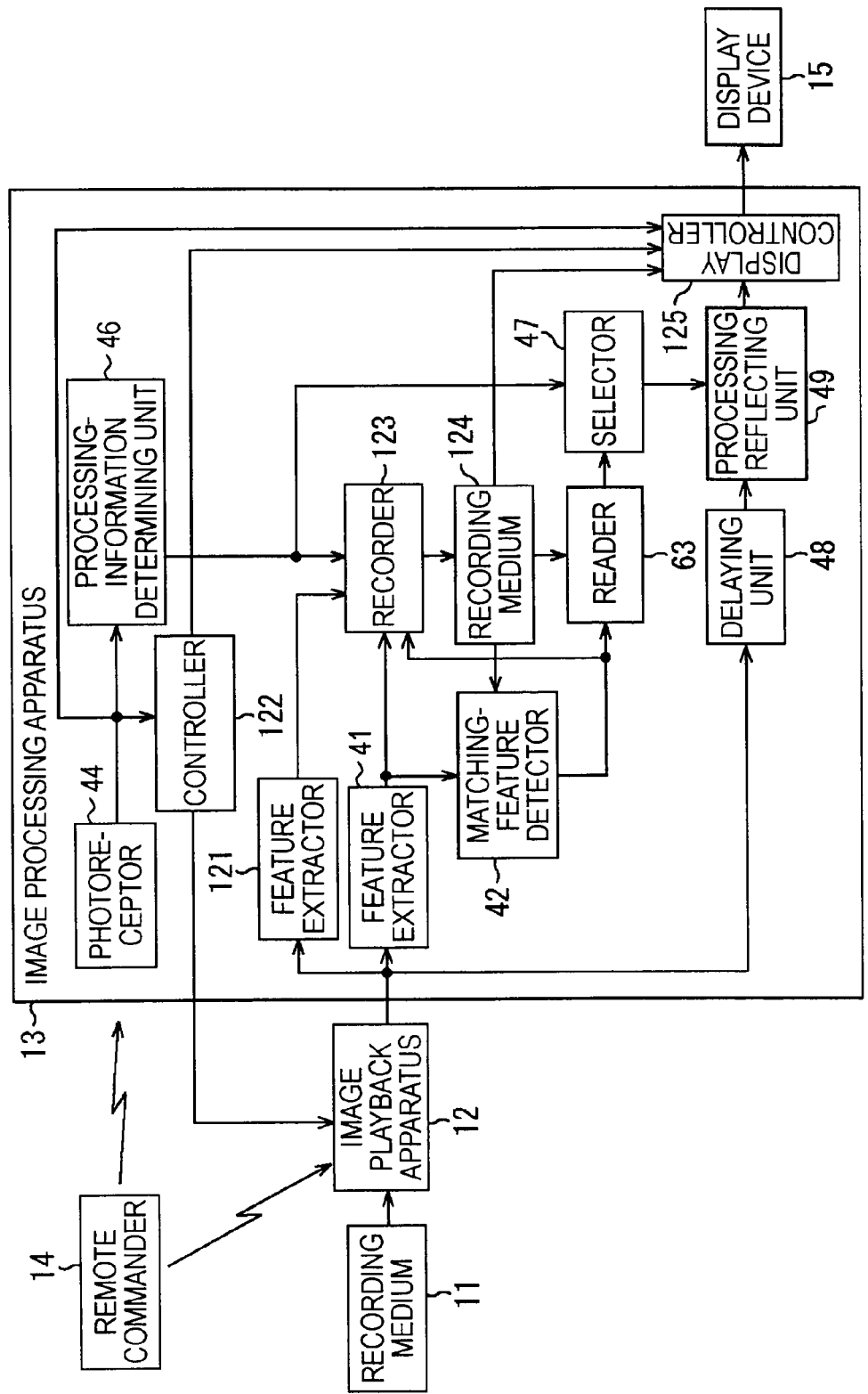
FIG. 8 is a block diagram showing a second example configuration of the image processing apparatus.

FIG. 8 is a block diagram showing a second example configuration of the image processing apparatus 13 shown in FIG. 1.

In FIG. 8, parts corresponding to those shown in FIG. 2 are designated by the same numerals, and description thereof will be omitted when appropriate.

The image processing apparatus 13 shown in FIG. 8 includes a feature extractor 41, a matching-feature detector 42, a photoreceptor 44, a processing-information determining unit 46, a selector 47, a delaying unit 48, and a processing reflecting unit 49, similarly to that shown in FIG. 2. However, the image processing apparatus 13 shown in FIG. 8 differs from that shown in FIG. 2 in that it includes a controller 122, a recorder 123, and a recording medium 124 instead of the controller 43, the recorder 61, and the recording medium 62, respectively, and additionally includes a feature extractor 121 and a display controller 125.

The feature extractor 121 receives from the image playback apparatus 12 image data that is the same as image data supplied to the feature extractor 41. Similarly to the feature extractor 41, the feature extractor 121 extracts features from individual frames of the image data sequentially supplied from the image playback apparatus 12, and supplies the features to the recorder 123 on a frame-by-frame basis.

However, the feature extractor 121 extracts from image data of one frame a feature having an amount of data less than the amount of data of the image data of one frame.

Hereinafter, the feature extracted by the feature extractor 121 will be referred to as a compressed feature when appropriate for distinction from a processing feature extracted by the feature extractor 41.

In contrast to a processing feature associated with the processing information, the compressed feature extracted by the feature extractor 121 need not be a feature that can serve to identify a frame on which editing processing represented by processing information is to be executed, but may be such a feature.

Similarly to the controller 43 shown in FIG. 2, the controller 122 controls component blocks of the image playback apparatus 12 or the image processing apparatus 13 according to operation signals received from the photoreceptor 44. Furthermore, the controller 122 controls the display controller 125 according to an operation mode.

Similarly to the recorder 61 shown in FIG. 2, the recorder 123 records a processing feature supplied from the feature extractor 41 on the recording medium 62 and records processing information supplied from the processing-information determining unit 46 on the recording medium 62 in association with the processing feature.

Furthermore, the recorder 123 records a compressed feature supplied from the feature extractor 121 on the recording medium 62.

Similarly to the recording medium 62 shown in FIG. 2, the recording medium 124 is, for example, a disk-shaped recording medium or a semiconductor memory, and processing information and processing features are recorded thereon. Furthermore, compressed features are also recorded on the recording medium 124.

Under the control of the controller 122, the display controller 125 supplies image data supplied from the processing reflecting unit 49 or a compressed feature recorded on the recording medium 124 to the display device 15 as display data so that an image corresponding to the display data will be displayed.

Next, an operation of the image processing apparatus 13 shown in FIG. 8 will be described with reference to flowcharts shown in FIGS. 9 to 11.

In the image processing apparatus 13 shown in FIG. 8, similarly to that shown in FIG. 2, a feature recording process and an editing/playback process are executed. Furthermore, the image processing apparatus 13 shown in FIG. 8 has a simple editing mode as well as the normal editing mode and the editing mode, so that the image processing apparatus 13 can also execute processing in the simple editing mode.

First, a feature recording process executed by the image processing apparatus 13 shown in FIG. 8 will be described with reference to a flowchart shown in FIG. 9.

For example, as described with reference to FIG. 5, when the operation mode is the normal playback mode, if the user operates the remote commander 14 to instruct playback, an operation signal corresponding to the operation is sent from the remote commander 14 and supplied to the controller 122 via the photoreceptor 44. Upon receiving the operation signal corresponding to the playback instruction operation when the operation mode is the normal playback mode, in step S51, the controller 122 sends a playback command for requesting playback to the image playback apparatus 12, so that the image playback apparatus 12 starts playback of image data recorded on the recording medium 11.

Upon starting playback of image data, the image playback apparatus 12 supplies the image data to the image processing apparatus 13. In the image processing apparatus 13, the image data supplied from the image playback apparatus 12 is supplied to the feature extractor 41, the feature extractor 121, and the delaying unit 48 on a frame-by-frame basis.

The image data supplied to the delaying unit 48 is supplied to the processing reflecting unit 49, and the processing reflecting unit 49 supplies the image data supplied from the delaying unit 48 as it is to the display controller 125. The display controller 125 supplies the image data supplied from the processing reflecting unit 49 to the display device 15 as display data when the image processing apparatus 13 is in the normal playback mode, so that a content image corresponding to the image data recorded on the recording medium 11 is displayed. The user can check the image corresponding to the image data recorded on the recording medium 11 by viewing the content image displayed.

Then, the process proceeds from step S51 to step S52. In step S52, a feature extracting process is executed. That is, the feature extractor 41 extracts a processing feature from a frame of image data supplied from the image playback apparatus 12, and the feature extractor 121 extracts a compressed feature from the frame. The process then proceeds to step S53.

In step S52, the processing feature extracted by the feature extractor 41 and the compressed feature extracted by the feature extractor 121 are supplied to the recorder 123.

In step S53, the recorder 123 records on the recording medium 124 the processing feature supplied from the feature extractor 41 and the compressed feature supplied from the feature extractor 121, i.e., the processing feature and compressed feature extracted from the same frame, in association with each other. The process then proceeds from step S53 to step S54.

The recorder 123 records processing features and compressed features so that the order of frames for extraction of the processing features and compressed features is maintained. That is, when a certain processing feature and compressed feature recorded on the recording medium 124 are a processing feature and compressed feature of the N-th frame of image data recorded on the recording medium 11, a processing feature and compressed feature of the (N+1)-th frame (or (N−1)-th frame) are recorded on the recording medium 124 so that it can be recognized that the processing feature and compressed feature of the (N+1)-th frame (or (N−1)-th frame) are a processing feature and compressed feature of a frame immediately succeeding (or preceding) the features of the N-th frame that have already been recorded.

In step S54, the controller 122 determines whether playback of all the image data recorded on the recording medium 11 has been finished. If it is determined in step S54 that playback of the image data recorded on the recording medium 11 has not been finished, i.e., if playback of image data is going on in the image playback apparatus 12, the process returns to step S52, and the subsequent processing steps are repeated on a next frame of image data supplied from the image playback apparatus 12.

On the other hand, if it is determined in step S54 that playback of all the image data recorded on the recording medium 11 has been finished, i.e., if playback of image data has been finished in the image playback apparatus 12, the feature recording process is exited.

Similarly to the recording of processing features on the recording medium 62 (FIG. 2), processing features and compressed features need not be recorded in duplicates on the recording medium 124.

Next, the editing/playback process executed by the image processing apparatus 13 shown in FIG. 8 will be described with reference to a flowchart shown in FIG. 10.

For example, as described with reference to FIG. 6, when the operation mode is the editing mode, if the user operates the remote commander 14 to instruct playback, an operation signal corresponding to the operation is sent from the remote commander 14 and supplied to the controller 122 via the photoreceptor 44. Upon receiving the operation signal corresponding to the playback instruction when the operation mode is the editing mode, the controller 122 sends a playback command for requesting playback to the image playback apparatus 12, so that the image playback apparatus 12 starts playback of image data recorded on the recording medium 11.

Upon starting playback of image data, the image playback apparatus 12 supplies the image data to the image processing apparatus 13. In the image processing apparatus 13, the image data supplied from the image playback apparatus 12 is supplied to the feature extractor 41, the feature extractor 121, and the delaying unit 48 on a frame-by-frame basis.

Figure 6:
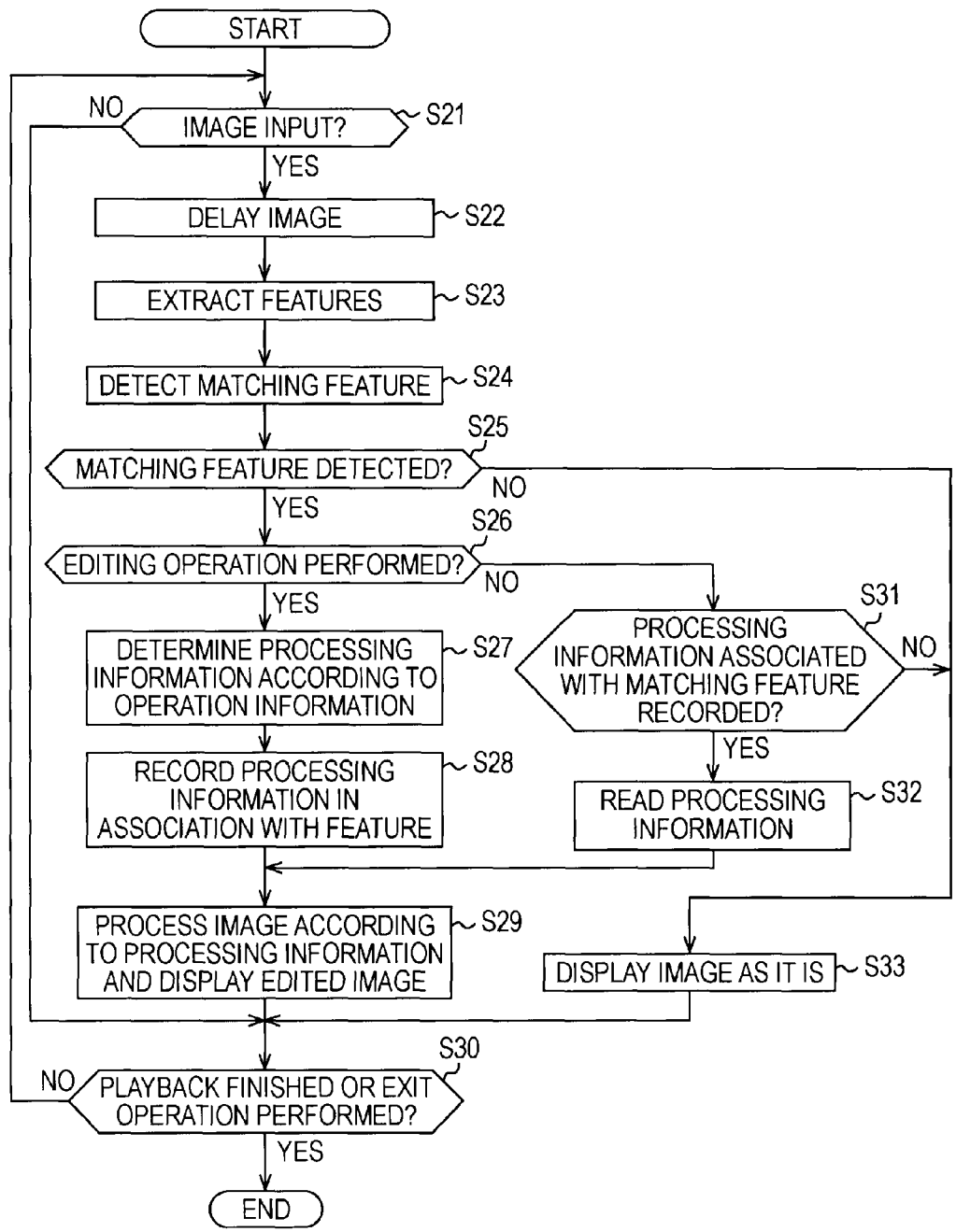
FIG. 6 is a flowchart of an editing/playback process.

Then, in the image processing apparatus 13, in steps S61 to S73, processing corresponding to steps S21 to S33 shown in FIG. 6 is executed.

Figure 10:
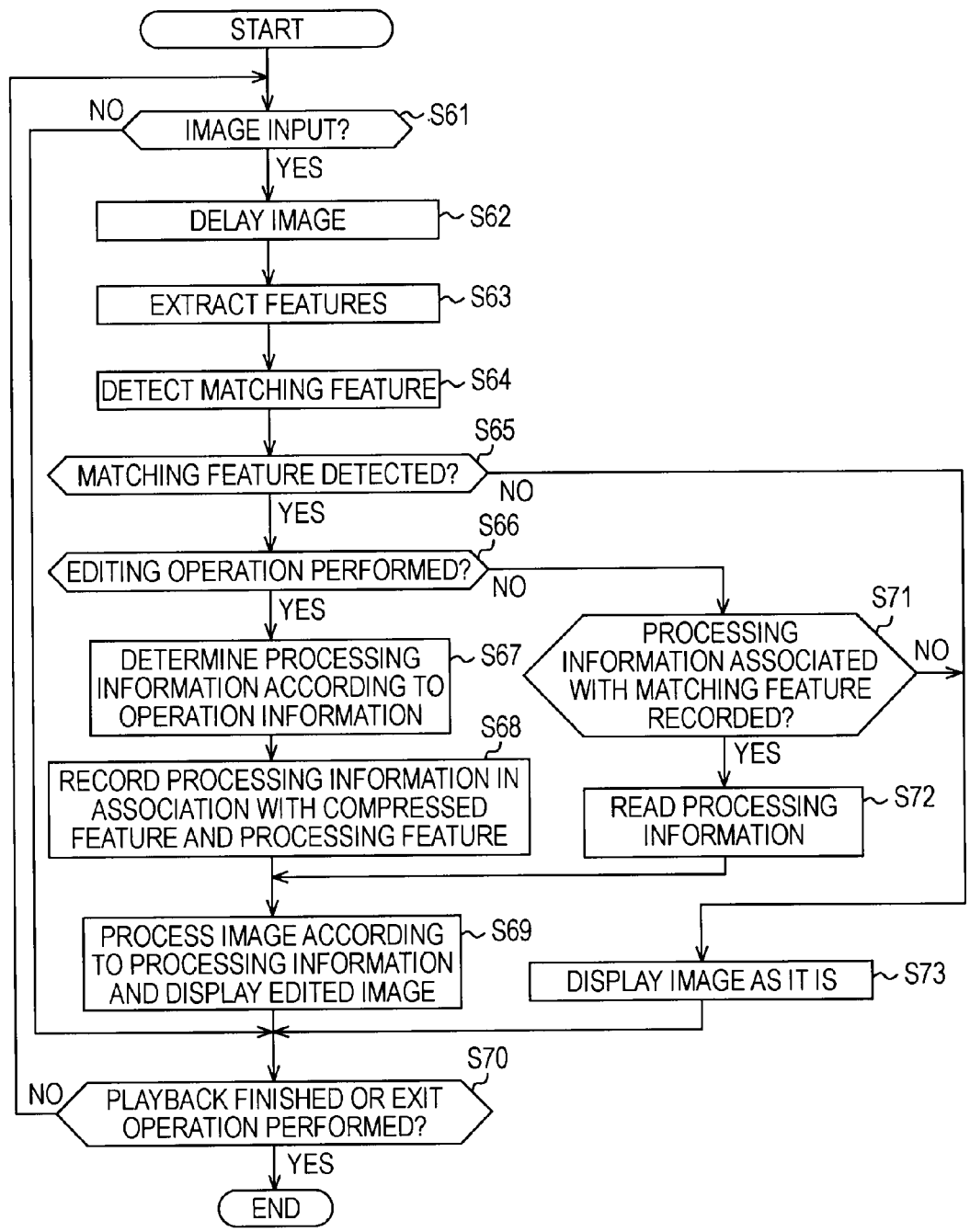
FIG. 10 is a flowchart of an editing/playback process.

However, as opposed to step S28 shown in FIG. 6 corresponding to step S68 shown in FIG. 10, in which the recorder 61 records on the recording medium 62 processing information supplied from the processing-information determining unit 46 in association with a processing feature of a subject frame among processing features recorded on the recording medium 62, in the image processing apparatus 13 shown in FIG. 8, since processing features and compressed features are recorded in association with each other on the recording medium 124, in step S68 shown in FIG. 10, the recorder 123 records processing information on the recording medium 124 in association with a processing feature and compressed feature of a subject frame.

In steps S69 and S73, the display controller 125 supplies the image data supplied from the processing reflecting unit 49 to the display device 15 as display data, so that an image corresponding to the display data is displayed.

Next, a simple editing process executed by the image processing apparatus 13 shown in FIG. 8 will be described with reference to a flowchart shown in FIG. 11.

When the user has selected the simple editing mode as the operation mode and operated the remote commander 14 to instruct playback, an operation signal corresponding to the operation is sent from the remote commander 14. The operation signal is received by the photoreceptor 44 and supplied to the controller 122. Upon receiving the operation signal corresponding to the playback instruction from the photoreceptor 44 when the operation mode is the simple editing mode, in step S91, the controller 122 controls the display controller 125 so that a compressed-feature displaying process of displaying a compressed feature extracted from image data on the recording medium 11 and recorded on the recording medium 124 is started.

More specifically, the display controller 125 first reads a compressed feature of the first frame of image data on the recording medium 11 from the recording medium 124 as a subject compressed feature, and supplies the subject compressed feature to the display device 15 as display data so that the compressed feature will be displayed. Similarly, the display controller 125 sequentially reads compressed features recorded on the recording medium 124 as subject compressed features and supplies the compressed features to the display device 15 so that compressed features will be displayed.

As described above, in the simple editing mode, instead of a content image corresponding to image data recorded on the recording medium 11, a compressed feature of the image data is displayed.

Then, the process proceeds from step S91 to step S92, in which the processing-information determining unit 46 determines whether the user has performed an editing operation using the remote commander 14.

If it is determined in step S92 that no editing operation has been performed, the process skips steps S93 and S94 and proceeds to step S95.

On the other hand, if it is determined in step S92 that an editing operation has been performed, i.e., if the user has performed an editing operation using the remote commander 14 to perform editing, such as ×2 zoom-up, while viewing the compressed feature displayed on the display device 15 and an operation signal corresponding to the editing operation has been received by the photoreceptor 44 and supplied to the processing-information determining unit 46, the process proceeds to step S93. In step S93, on the basis of the operation signal supplied from the photoreceptor 44, the processing-information determining unit 46 determines editing processing that is to be executed on the image data of the subject frame, and supplies processing information representing the editing processing to the recorder 123. The process then proceeds to step S94.

In step S94, the recorder 123 records the processing information supplied from the processing-information determining unit 46 on the recording medium 124 in association with the compressed feature read by the display controller 125 from the recording medium 124 as the subject compressed feature and the processing feature associated with the compressed feature. The process then proceeds to step S95.

That is, if an editing operation is performed while a subject compressed feature is being displayed, processing information representing editing processing corresponding to the editing operation is recorded on the recording medium 124 in association with the compressed feature and processing feature of the frame on which the editing processing is to be executed.

In step S95, the display controller 125 determines whether display of all the compressed features recorded on the recording medium 124 has been finished or the remote commander 14 has been operated to finish playback.

If it is determined in step S95 that display of all the compressed features recorded on the recording medium 124 has not been finished and that the remote commander 14 has not been operated to finish playback, the process returns to step S92, and the subsequent processing steps are repeated.

On the other hand, if it is determined in step S95 that display of all the compressed features recorded on the recording medium 124 has been finished or that the remote commander 14 has been operated to finish playback, the simple editing process is exited.

As described above, in the simple editing mode, instead of a content image corresponding to image data recorded on the recording medium 11, a compressed feature of the image data is displayed. Thus, the user performs an editing operation while viewing the compressed feature.

Next, compressed features will be described with reference to FIGS. 12 to 14.

As a compressed feature of image data of one frame, information that has an amount of data less than the amount of data of the image data of the one frame and that invites the user to perform an editing operation can be used.

For example, for example, a part of a bit sequence representing pixel values (e.g., luminance values) of pixels in the image data of one frame, information representing motion in the image data of one frame, or information representing spatial activity in the image data of one frame may be used.

Figure 12:
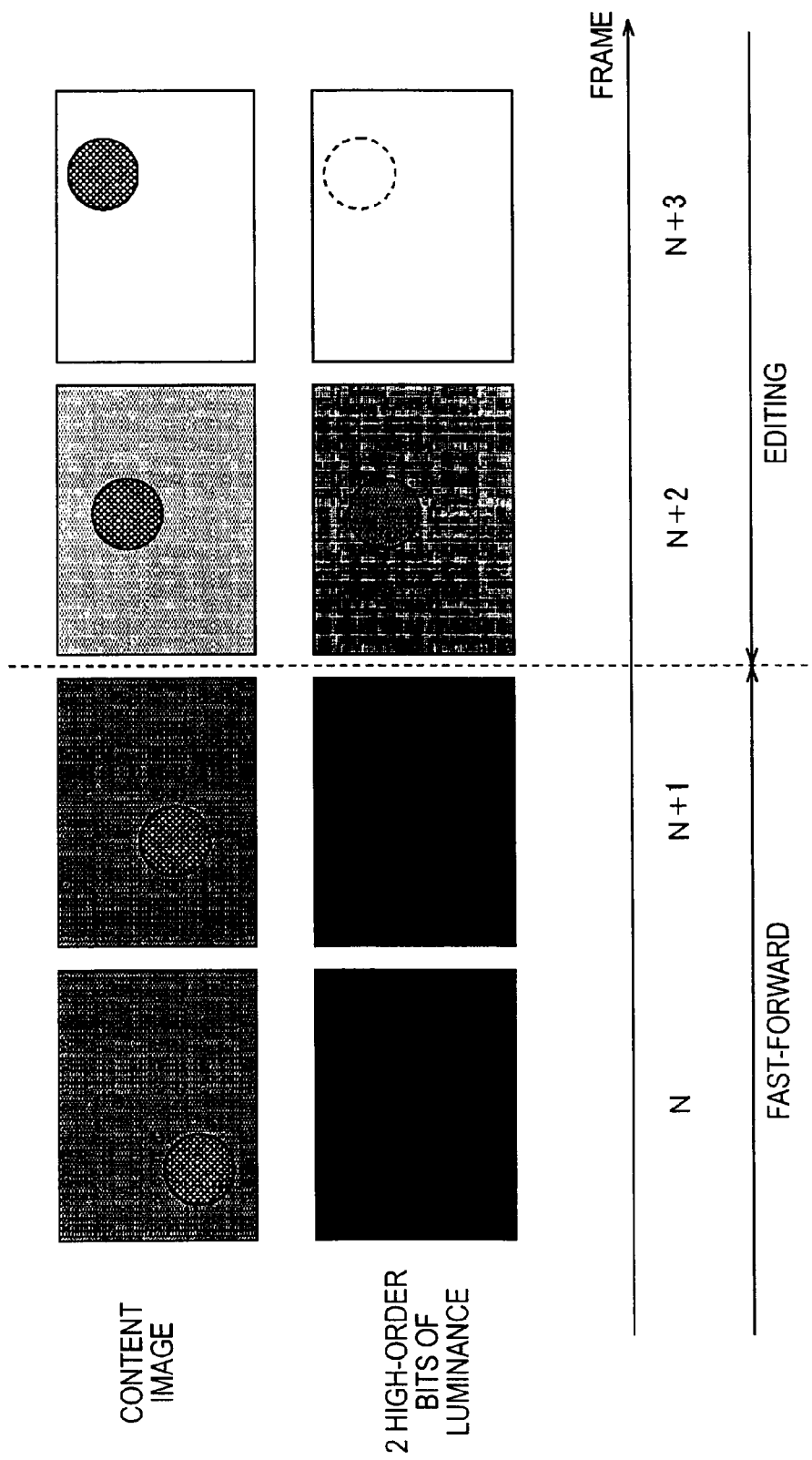
FIG. 12 is a diagram showing an example of display of a compressed feature.

FIG. 12 shows an example of a compressed feature that is displayed in a case where a part of a bit sequence representing pixel values is used.

More specifically, the upper part of FIG. 12 shows a content image, and the lower part of FIG. 12 shows an image represented by high-order two bits of a bit sequence representing pixel values of image data of the content image, which serves as a compression feature extracted from the image data of the content image.

In the content image shown in the upper part of FIG. 12, from the N-th frame to the (N+4)-th frame, a circular object moves diagonally right above from a lower left section and gradually gets brighter.

When the high-order two bits of the bit sequence of pixel values is used as a compression feature and the compression feature is displayed, i.e., when an image having pixel values corresponding to the compressed feature is displayed, distinction between a dark scene and a bright scene becomes easier, as shown in the lower part of FIG. 12.

Thus, when the user wished to edit only bright scenes in a content image, by using the high-order two bits of the bit sequence representing pixel values for display, the user can readily find frames of bright scenes that are to be edited. This facilitates editing tasks.

Furthermore, for example, by operating the remote commander 14, the user can fast-forward the display of compressed feature by the display controller 125 for dark scenes that need not be edited. This serves to reduce time taken for editing.

As a part of a bit sequence of pixel values of a content image, used as a compression feature, instead of the high-order two bits of the bit sequence, for example, the highest order one bit or the high-order three bits may be used.

Figure 13:
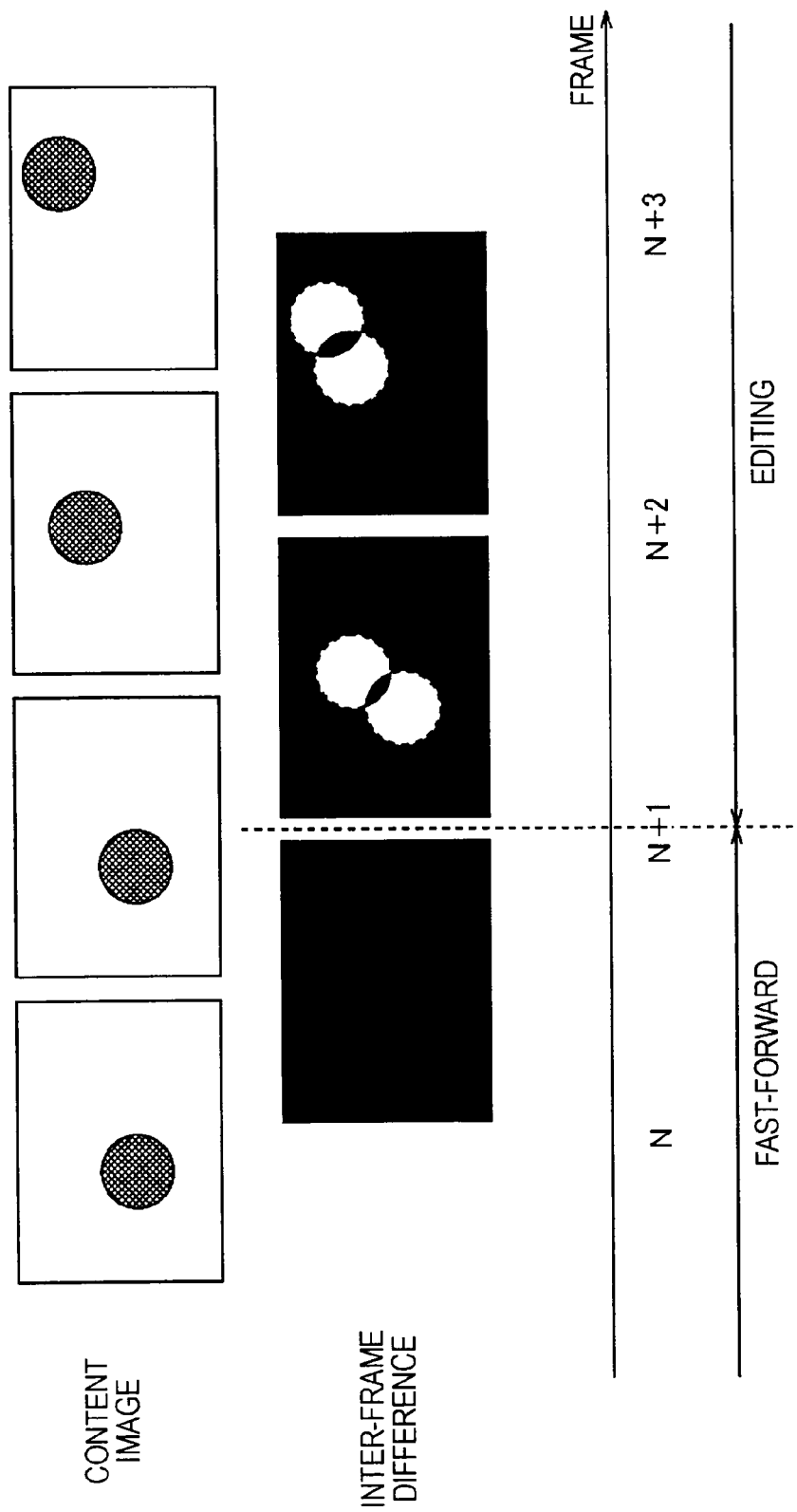
FIG. 13 is a diagram showing an example of display of a compressed feature.

FIG. 13 shows an example of a compressed feature that is displayed in a case where information representing motion is used as a compressed feature.

More specifically, the upper part of FIG. 13 shows a content image, and the lower part of FIG. 13 shows an image represented by pixel values obtained by binarizing the (absolute values of) differences between pixel values of corresponding pixels in adjacent frames of the content image with respect to a predetermined threshold, which serves as a compressed feature extracted from the image data of the content image.

In the content image shown in the upper part of FIG. 13, a circular object exists. The circular object is still in the N-th frame and the (N+1)-th frame and is moving diagonally right above from a lower left section in the (N+2)-th frame and the (N+3)-th frame.

When a value obtained by binarizing the difference between pixel values of adjacent frames with respect to a predetermined threshold is used as a compressed feature and the compressed feature is displayed, i.e., an image having pixel values corresponding to the compressed feature is displayed, as shown in the lower part of FIG. 13, distinction between scenes including a moving object and scenes not including any moving object becomes easier.

Thus, when the user wished to edit only scenes including a moving object in a content image, by using values obtained by binarizing differences between pixel values of corresponding pixels in adjacent frames with respect to a predetermined threshold as a compression feature, the user can readily find frames that are to be edited, i.e., frames of scenes including a moving object. This facilitates editing tasks.

Furthermore, regarding scenes that need not be edited, i.e., scenes not including any moving object, for example, the user can fast-forward the display of compressed features by the display controller 125 by operating the remote commander 14, time taken for editing can be reduced.

As information representing motion in a content image, used as a compression feature, instead of values obtained by binarizing differences between pixel values of corresponding pixels in adjacent frames with respect to a predetermined threshold, for example, magnitudes of motion vectors detected in individual blocks of a predetermined size may be used.

Figure 14:
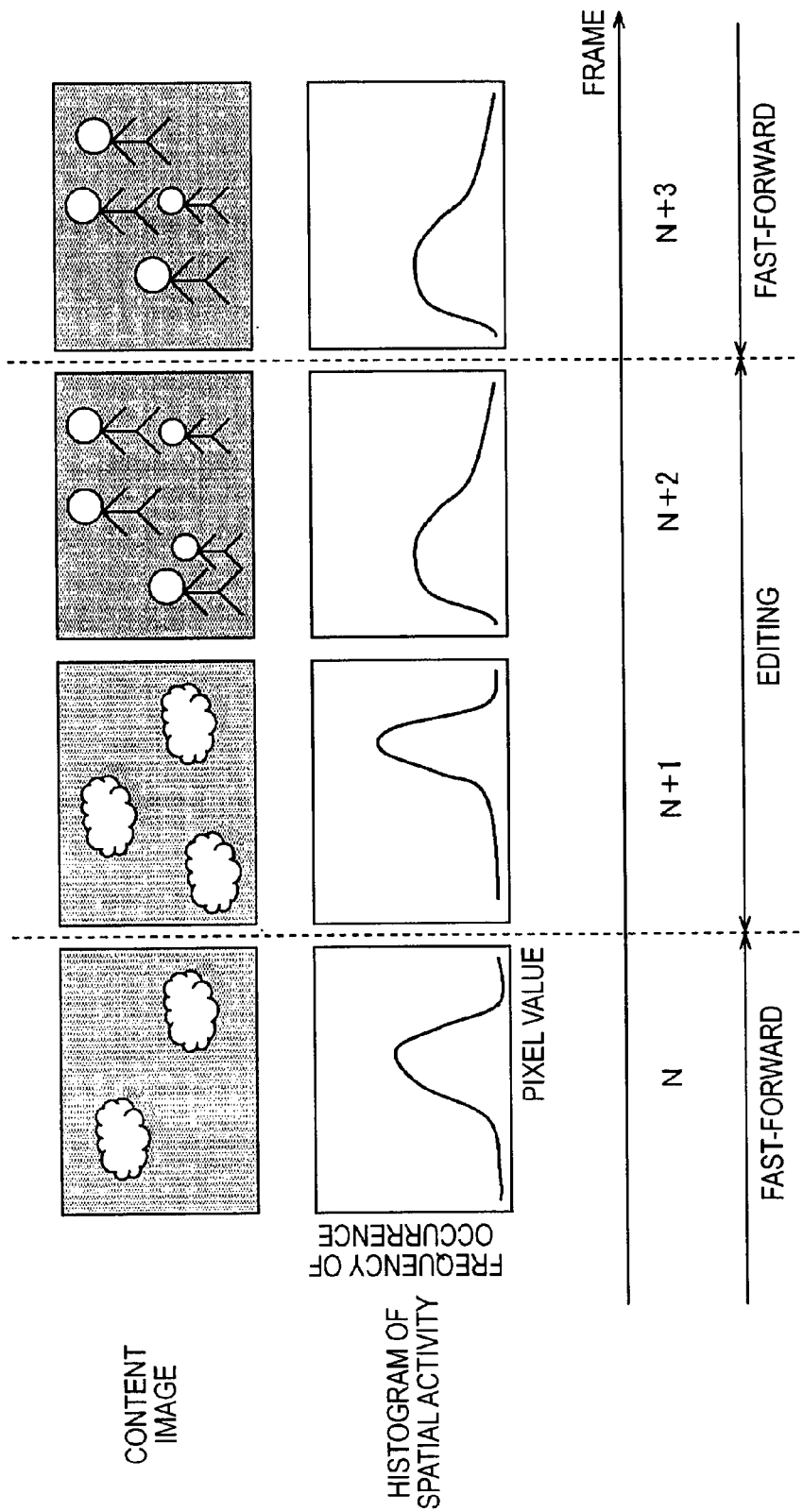
FIG. 14 is a diagram showing an example of display of a compressed feature.

Next, FIG. 14 shows an example of a compressed feature that is displayed in a case where information representing spatial activity is used as a compressed feature.

More specifically, the upper part of FIG. 14 shows a content image, and the lower part of FIG. 14 shows a histogram of pixel values in the content image, which serves as a compressed feature extracted from image data of the content image.

In the content image shown in the upper part of FIG. 14, the sky with clouds are shown in the N-th frame and the (N+1)-th frame, and after a scene change occurs, a crowd is shown in the (N+2)-th frame and the (N+3)-th frame.

When a histogram of pixel values is used as a compressed feature and the compressed feature is displayed, as shown in the lower part of FIG. 14, the shape of the histogram serving as the compressed feature considerably changes across the scene change. Thus, the scene change can be readily recognized.

Thus, when the user wishes to edit only scenes in the proximity of a scene change in a content image, by displaying a histogram of pixel values as a compressed feature, the user can readily find scenes that are to be edited, i.e., scenes in the proximity of a scene change. This facilitates editing tasks.

As for scenes that need not be edited, i.e., scenes not in the proximity of a scene change, for example, the user can fast-forward the display of compressed features by the display controller 125 by operating the remote commander 14. This serves to reduce time taken for editing.

As information representing spatial activity, used as a compression feature, instead of a histogram of pixel values, for example, differences of pixel values between adjacent pixels may be used.

If image data recorded on the recording medium 11 is large-volume image data, such as full high-definition (HD) image data, and is encoded according to MPEG (Moving Picture Experts Group) or the like, the load of processing for playback, fast-forward, or rewinding, executed in the editing/playback process described with reference to FIG. 7, becomes considerably large.

In the case of the simple editing process (FIG. 11), since compressed features having less amounts of data are displayed instead of a content image corresponding to image data recorded on the recording medium 11, the load of processing can be reduced.

Even if a compressed feature with which it is not possible to recognize the content of a content image just by viewing the compressed feature is used, such as a histogram of pixel values, if the feature recording process shown in FIG. 9 is executed and the user has checked an image corresponding to image data recorded on the recording medium 11 and has made an overall plan of editing before editing the image data as described earlier, the user is aware of the content of the content image to a certain extent. Thus, the user can guess scenes that are to be edited and perform editing just by viewing the compressed feature.

Furthermore, for example, the user may be allowed to specify, by an operation of the remote commander 14, which of a plurality of types of compressed feature is to be extracted, for example, among a part of a bit sequence representing pixel values, information representing motion, information representing spatial activity, and so forth, in consideration of scenes that are to be edited.

Furthermore, the feature extractor 121 can extract a plurality of types of compressed feature and record the plurality of types of compressed feature on the recording medium 124. In this case, a compression feature that is to be read by the display controller 125 and displayed on the display device 15 in the simple editing process can be selected from a plurality of types of compressed feature recorded on the recording medium 124.

For example, the user can specify which of the plurality of types of compressed feature is to be displayed in the simple editing process by operating the remote commander 14. Furthermore, the display controller 125 can display two or more types of compressed feature among a plurality of types of compressed feature, as arrayed horizontally or vertically.

Regarding scenes that need not be edited, although the display of compressed features is fast-forwarded manually according to a user's operation of the remote commander 14 in the case shown in FIGS. 12 to 14, alternatively, the display of compressed features can be fast-forwarded automatically.

Figure 15:
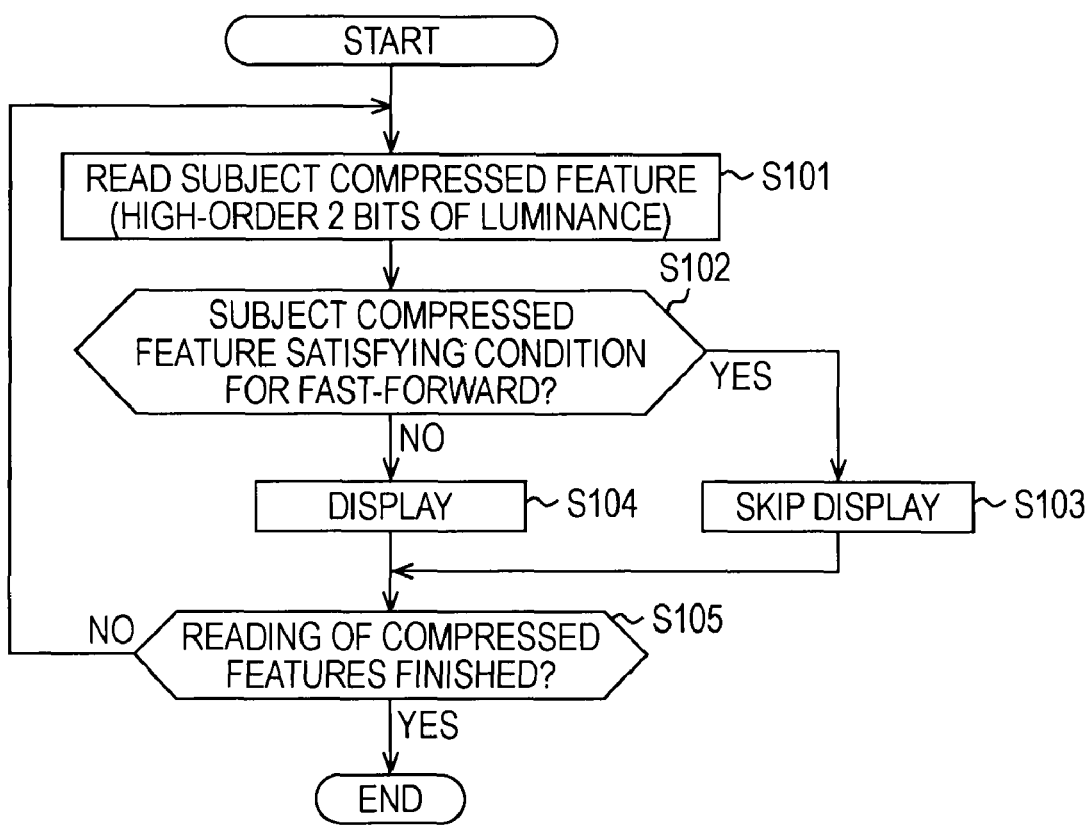
FIG. 15 is a flowchart of a compressed-feature displaying process.

Now, a compressed-feature displaying process started in step S91 shown in FIG. 11 in a case where the display of compressed features is fast-forwarded automatically will be described with reference to a flowchart shown in FIG. 15.

In step S101, as a subject compressed feature, the display controller 125 reads a compressed feature that is temporally earliest among the compressed features recorded on the recording medium 124 and not yet selected as a subject compressed feature. The process then proceeds to step S102.

In step S102, the display controller 125 determines whether the subject compressed feature satisfies a condition for fast-forwarding.

For example, when the compressed feature is the high-order two bits of a bit sequence representing pixel values as described with reference to FIG. 12, the condition for fast-forwarding may be that the high-order two bits are 0 for the entire one frame. As another example, when the compressed feature is values obtained by binarizing differences of pixel values of corresponding pixels in adjacent frames with respect to a predetermined threshold as described in FIG. 13, the condition for fast-forwarding may be that the binarized values are 0 for the entire one frame or that the sum of (the absolute values of) pixel values of corresponding pixels in adjacent frames is less than or equal to a predetermined threshold.

The condition for fast-forwarding can be set, for example, by a user's operation of the remote commander 14.

If it is determined in step S102 that the compressed feature satisfies the condition for fast-forwarding, i.e., for example, if the compressed feature is the high-order two bits of a bit sequence representing pixel values and the subject compressed feature of one frame is all 0, the process proceeds to step S103. In step S103, the display controller 125 skips the display of the subject compressed feature. The process then proceeds to step S105.

In the skipping process, it is possible not to display the subject compressed feature of one frame at all on the display device 15, and it is also possible to display the subject compressed feature of one frame on the display device 15 during a period sufficiently shorter than a frame period of the content image.

On the other hand, if it is determined in step S102 that the subject compressed feature does not satisfy the condition for fast-forwarding, the process proceeds to step S104. In step S104, the display controller 125 displays on the display device 15 the subject compressed feature of one frame for a period corresponding to a period of one frame of the content image. The process then proceeds to step S105.

In step S105, the display controller 125 determines whether the display controller 125 has read from the recording medium 124 the compressed features of all the frames of the content image.

If it is determined in step S105 that the compressed features of all the frames of the content image have not been read from the recording medium 124, i.e., if there exists any compressed feature that has not been selected as a subject compressed feature, the process returns to step S101. In step S101, as described earlier, the display controller 125 reads a compressed feature of a frame that is temporally earliest among the compressed features that have not been selected as a subject compressed feature. Then, the subsequent processing steps are repeated.

On the other hand, if it is determined in step S105 that the compressed features of all the frames of the content image have been read from the recording medium 124, the compressed-feature displaying process is exited.

Figure 16:
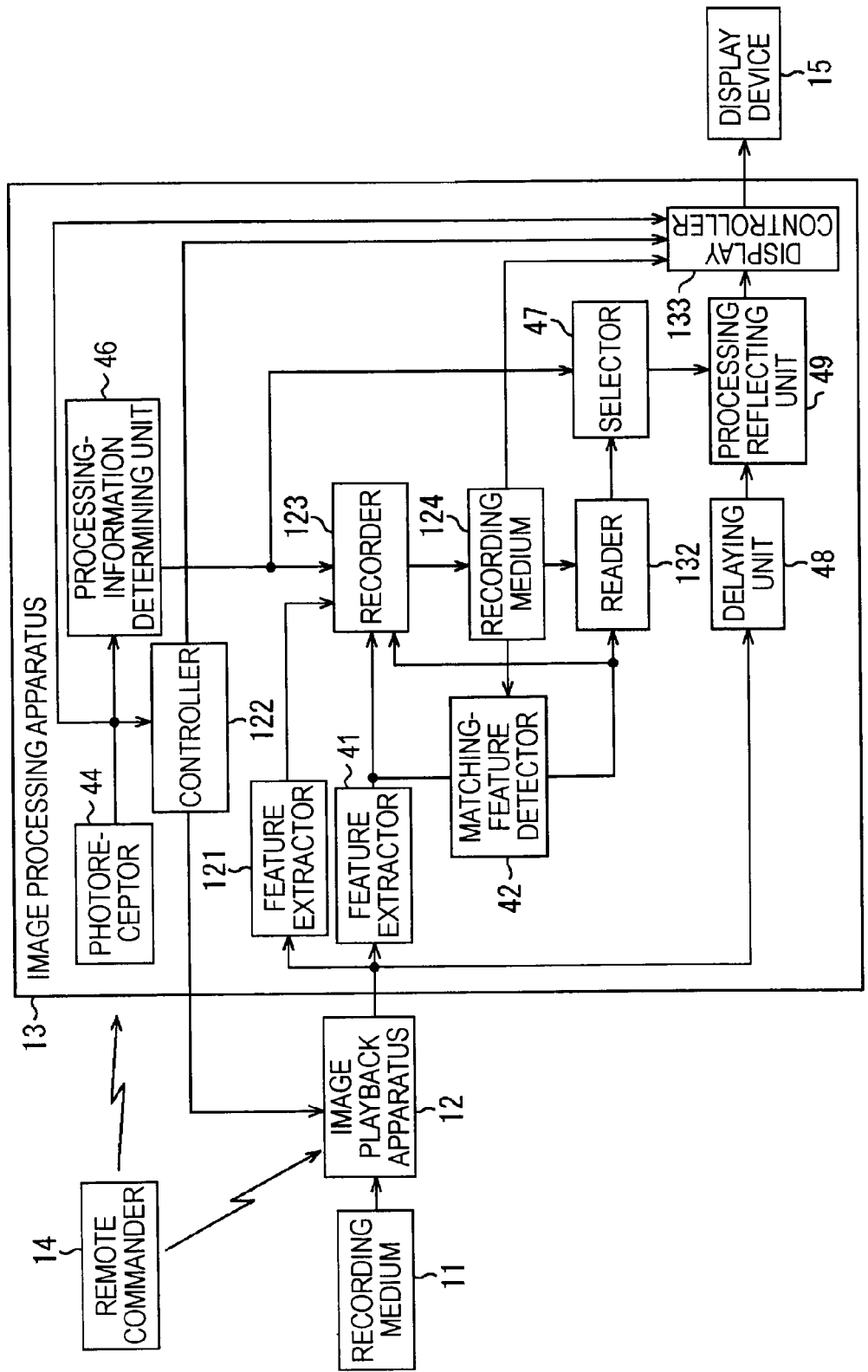
FIG. 16 is a block diagram showing a third example configuration of the image processing apparatus.

FIG. 16 is a block diagram showing a third example configuration of the image processing apparatus 13 shown in FIG. 1.

In FIG. 16, parts corresponding to those shown in FIG. 8 are designated by the same numerals, and description thereof will hereinafter be omitted when appropriate.

The image processing apparatus 13 shown in FIG. 16 includes a feature extractor 41, a matching-feature detector 42, a photoreceptor 44, a processing-information determining unit 46, a selector 47, a delaying unit 48, a processing reflecting unit 49, a feature extractor 121, a controller 122, a recorder 123, and a recording medium 124, similarly to that shown in FIG. 8. However, the image processing apparatus 13 shown in FIG. 16 differs from that shown in FIG. 8 in that it includes a reader 132 and a display controller 133 instead of the reader 63 and the display controller 125, respectively.

The reader 132 executes processing similarly to the reader 63 shown in FIG. 8 (FIG. 2). Furthermore, the reader 132 recognizes a processing feature associated with a compressed feature that is displayed on the display device 15 by the display controller 133, and reads processing information associated with the processing feature from the recording medium 124 and supplies the processing information to the selector 47.

The display controller 133 supplies image data supplied from the processing reflecting unit 49 or a compressed feature recorded on the recording medium 124 to the display device 15 as display data so that an image corresponding to the display data will be displayed, similarly to the display controller 125 shown in FIG. 8. Alternatively, the display controller 133 generates display data in which image data supplied from the processing reflecting unit 49 and a compressed feature recorded on the recording medium 124 are arrayed horizontally, vertically, or the like, and displays the display data on the display device 15.

The image processing apparatus 13 configured as described above and shown in FIG. 16 can execute the feature recording process (FIG. 9), the editing/playback process (FIG. 10), and the simple editing process (FIG. 11) including the compressed-feature displaying process (FIG. 15), similarly to the case shown in FIG. 8.

In the simple editing process shown in FIG. 11 (i.e., the compressed-feature displaying process started in step S91 of the simple editing process), a compressed feature is displayed, but no content image is displayed. Since no content image is displayed, the user is not allowed to check an image obtained through editing processing corresponding to an editing operation performed using the remote commander 14.

Thus, in the image processing apparatus 13 shown in FIG. 16, a content image is displayed together with a compressed feature when the simple editing process is executed, so that the user is allowed to check an edited image.

Now, the simple editing process executed by the image processing apparatus 13 shown in FIG. 16, in which a content image is displayed together with a compressed feature, will be described with reference to a flowchart shown in FIG. 17.

It is assumed that, in the image processing apparatus 13 shown in FIG. 16, the feature recording process (FIG. 9) has already been executed and finished, so that compressed features and processing features of individual frames of image data recorded on the recording medium 11 have been recorded on the recording medium 124.

When the user has selected the simple editing mode as the operation mode and has operated the remote commander 14 to instruct playback, an operation signal corresponding to the operation is sent from the remote commander 14. The operation signal is received by the photoreceptor 44 and supplied to the controller 122. Upon receiving the operation signal corresponding to the playback instruction operation when the operation mode is the simple editing mode, in step S121, the controller 122 controls the display controller 133 to start a compressed-feature displaying process of displaying a compressed feature extracted from image data on the recording medium 11 and recorded on the recording medium 124, similarly to step S91 shown in FIG. 11.

More specifically, as subject compressed features, the display controller 133 reads from the recording medium 124 the compressed features of individual frames, extracted from image data on the recording medium 11, and supplies the subject compressed features to the display device 15 so that the compressed features are displayed in a part of a display screen of the display device 15.

Then, the process proceeds from step S121 to step S122. In step S122, the controller 122 recognizes the frame of a subject compressed feature being displayed on the display device 15 by the display controller 133 as a subject frame. The process then proceeds to step S123.

In step S123, the controller 122 requests the image playback apparatus 12 to play back the subject frame. The process then proceeds to step S124.

Upon receiving the request for playing back the subject frame, the image playback apparatus 12 plays back image data of the subject frame from the recording medium 11 and supplies the image data to the image processing apparatus 13. In the image processing apparatus 13, the image data of the subject frame, supplied from the image playback apparatus 12, is supplied to the delaying unit 48. The delaying unit 48 temporarily stores the image data of the subject frame, supplied from the image playback apparatus 12.

In step S124, the processing-information determining unit 46 determines whether the user has performed an editing operation using the remote commander 14.

If it is determined in step S124 that an editing operation has been performed, i.e., if the user has performed an editing operation using the remote commander 14, for example, to perform editing such as ×2 zoom-up, while viewing the compressed feature of the subject frame displayed on the display device 15 and an operation signal corresponding to the editing operation has been received by the photoreceptor 44 and supplied to the processing-information determining unit 46, the process proceeds to step S125. In step S125, on the basis of the operation signal supplied from the photoreceptor 44, the processing-information determining unit 46 determines editing processing that is to be executed on the image data of the subject frame, and supplies processing information representing the editing processing to the selector 47 and the recorder 123. The process then proceeds to step S126.

In step S126, the recorder 123 recognizes a processing feature associated with the subject compressed feature being displayed by the display controller 133 among the processing features recorded on the recording medium 124, and records the processing information supplied from the processing-information determining unit 46 on the recording medium 124 in association with the processing feature. The process then proceeds to step S127.

As described above, when the user has performed an editing operation, processing information representing editing processing corresponding to the editing operation is recorded on the recording medium 124 in association with the processing feature of a frame whose compression feature was being displayed when the editing operation was performed.

In step S127, the selector 47 selects processing information supplied from the processing-information determining unit 46 in immediately preceding step S125, and supplies the processing information to the processing reflecting unit 49. The processing reflecting unit 49 executes editing processing represented by the processing information supplied from the selector 47, i.e., in this case, editing processing corresponding to the editing operation performed by the user, on the image data of the subject frame stored in the delaying unit 48, and supplies the resulting edited image data to the display controller 133.

Furthermore, in step S127, the display controller 133 supplies the edited image data supplied from the processing reflecting unit 49 to the display device 15 so that a corresponding image will be displayed in another part of the display screen of the display device 15, for example, in a part adjacent to the part where the subject compressed feature is displayed. The process then proceeds to step S128.

Thus, when an editing operation has been performed, on the display device 15, a content image corresponding to the edited image data obtained through the editing processing corresponding to the editing operation is displayed together with the compressed feature of the subject frame. Thus, the user can check the edited image.

On the other hand, if it is determined in step S124 that no editing operation has been performed, the process proceeds to step S129. In step S129, the reader 132 determines whether processing information is recorded in association with the subject compressed feature recorded on the recording medium 124.

More specifically, in step S129, the reader 132 recognizes a processing feature associated with the subject compressed feature being displayed by the display controller 133 from the processing features recorded on the recording medium 124, and determines whether processing information is recorded in association with the processing feature.

If it is determined in step S129 that no processing information is recorded in association with the subject compressed feature, i.e., if no editing operation has been performed before on the frame of the subject compressed feature (subject frame) so that no processing information is recorded on the recording medium 124 in association with the subject compressed feature, the process proceeds to step S131. In step S131, the processing reflecting unit 49 supplies the image data of the subject frame stored in the delaying unit 48 to the display controller 133 as it is.

Furthermore, in step S131, the display controller 133 supplies the image data supplied from the processing reflecting unit 49 to the display device 15 so that a corresponding image will be displayed in another part of the display screen of the display device 15, for example, a part adjacent to the part where the subject compressed feature is displayed. The process then proceeds to step S128.

Thus, when no editing operation has been performed and processing information is not recorded on the recording medium 124 in association with the subject compressed feature (processing feature associated with the subject compressed feature), on the display device 15, a content image corresponding to the image data of the subject frame played back from the recording medium 11 is displayed together with the compressed feature of the subject frame.

On the other hand, if it is determined in step S129 that processing information is recorded in association with the subject compressed feature, i.e., if an editing operation has been performed before on the frame of the subject compressed feature (subject frame) so that processing information has been recorded on the recording medium 124 in association with the subject compressed feature, the process proceeds to step S130. In step S130, the reader 132 reads the processing information associated with the subject compressed feature of the subject frame from the recording medium 124, i.e., recognizes the processing feature associated with the subject compressed feature on the recording medium 124 and reads the processing information associated with the processing feature, and supplies the processing feature to the selector 47. The process then proceeds to step S127.

In step S127, the selector 47 selects processing information supplied in immediately preceding step S130 from the reader 132, and supplies the processing information to the processing reflecting unit 49. That is, in this case, since no editing operation has been performed, the selector 47 does not receive processing information from the processing-information determining unit 46 and receives processing information from the reader 132. Thus, the selector 47 selects processing information supplied from the reader 132 in immediately preceding step S130, and supplies the processing information to the processing reflecting unit 49.

The processing reflecting unit 49 executes editing processing represented by the processing information supplied from the selector 47, in this case, editing processing represented by the processing information recorded on the recording medium 124 in association with the subject compressed feature of the subject frame, on the image data of the subject frame stored in the delaying unit 48, and supplies the resulting edited image data to the display controller 133.

The display controller 133 supplies the edited image data supplied from the processing reflecting unit 49 to the display device 15 so that a corresponding image is displayed in another part of the display screen of the display device 15, for example, a part adjacent to the part where the subject compressed feature is displayed. The process then proceeds from step S127 to step S128.

Thus, when no editing operation has been performed but editing processing was performed while the subject frame was played back in the past so that processing information representing the editing processing corresponding to an editing operation performed in the past has been recorded in association with a compressed feature and processing feature of the subject frame, on the display device 15, a content image corresponding to edited image data obtained by executing editing processing corresponding to the editing operation performed in the past on the image data of the subject frame is displayed together with the compressed feature of the subject frame.

In step S128, the display controller 133 determines whether display of all the compressed features recorded on the recording medium 124 has been finished or the remote commander 14 has been operated to finish playback.

If it is determined in step S128 that display of all the compressed features recorded on the recording medium 124 has not been finished and that the remote commander 14 has not been operated to finish playback, the process returns to step S122. Then, the subsequent processing steps are repeated similarly.

On the other hand, if it is determined in step S128 that display of all the compressed features recorded on the recording medium 124 has been finished or that the remote commander 14 has been operated to finish playback, the simple editing process comes to an end.

Figure 17:
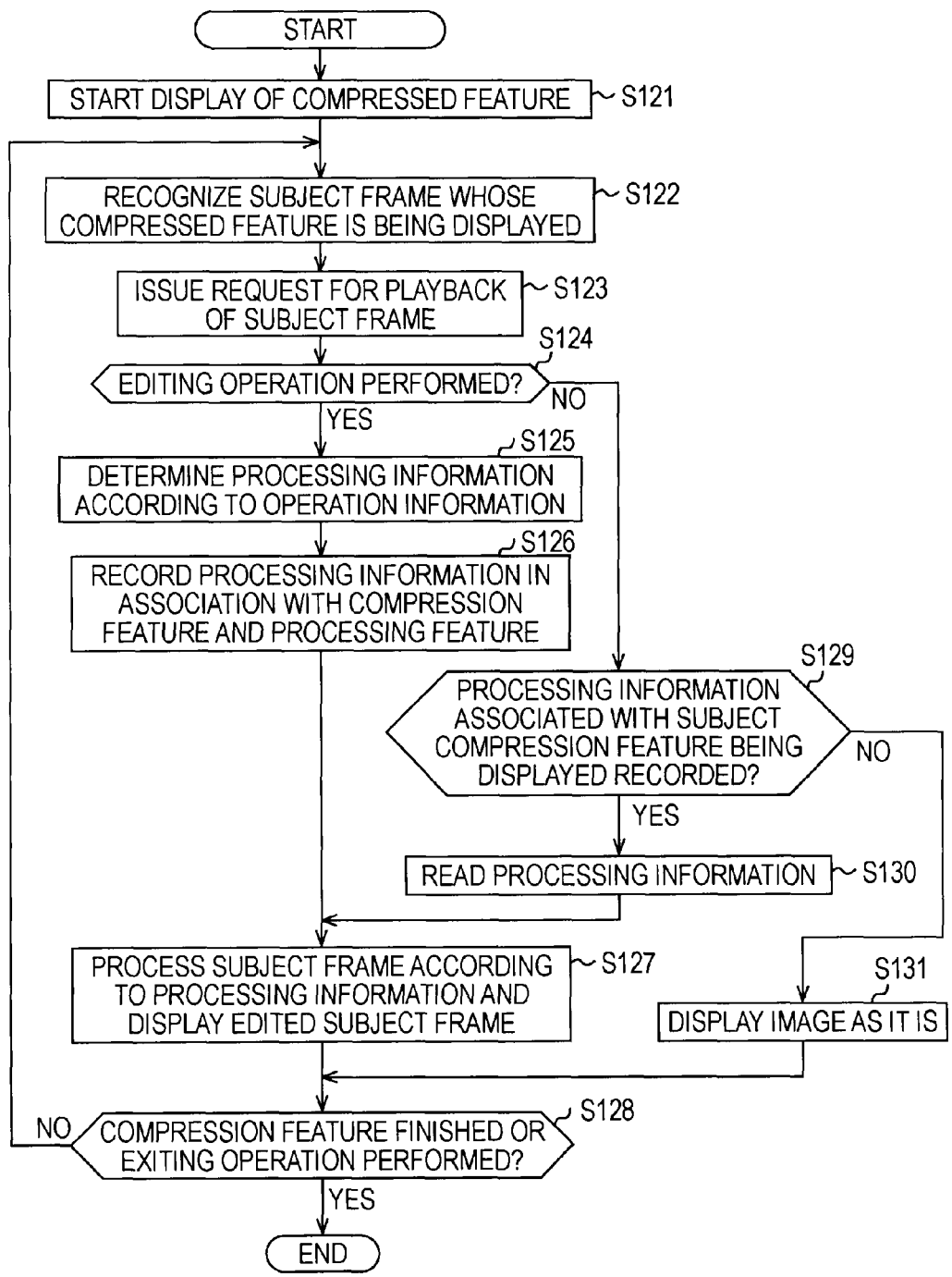
FIG. 17 is a flowchart of a simple editing process.

As described above, in the simple editing process shown in FIG. 17, a compressed feature of image data recorded on the recording medium 11 is displayed and a content image corresponding to the image data or edited image data obtained by editing the image data is displayed. Thus, the user can perform editing operation with reference to the compressed feature and check an image obtained by executing editing processing corresponding to the editing operation.

Figure 18:
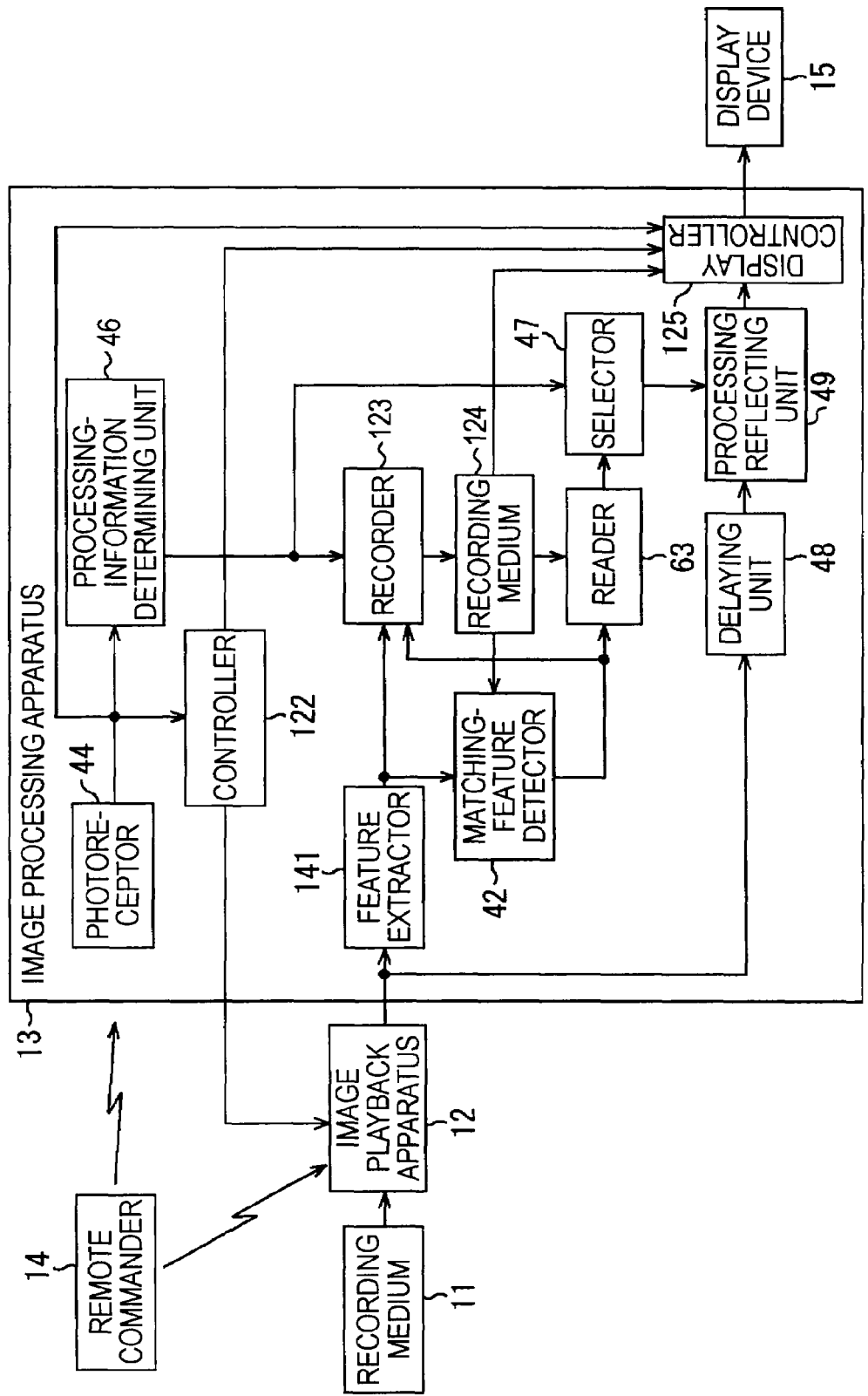
FIG. 18 is a block diagram showing a fourth example configuration of the image processing apparatus.

FIG. 18 is a block diagram showing a fourth example configuration of the image processing apparatus 13 shown in FIG. 1.

In FIG. 18, parts corresponding to those shown in FIG. 8 are designated by the same numerals, and description thereof will hereinafter be omitted when appropriate.

The image processing apparatus 13 shown in FIG. 18 includes a matching-feature extractor 42, a photoreceptor 44, a processing-information determining unit 46, a selector 47, a delaying unit 48, a processing reflecting unit 49, a reader 63, a controller 122, a recorder 123, a recording medium 124, and a display controller 125, similarly to that shown in FIG. 8. However, the image processing apparatus 13 shown in FIG. 18 differs from that shown in FIG. 8 in that it includes a single feature extractor 141 instead of the two feature extractors 41 and 121.

The feature extractor 141 receives from the image playback apparatus 12 image data played back from the recording medium 11 on a frame-by-frame basis. The feature extractor 141 extracts a feature from image data of one frame supplied from the image playback apparatus 12, and supplies the feature to the matching-feature detector 42 and the recorder 123.

In the case of the image processing apparatus 13 shown in FIG. 8, the feature extractor 41 extracts from image data of one frame information that can serve to identify the frame, which serves as a processing feature. Furthermore, the feature extractor 121 extracts information that has a less amount of data than the image data of one frame from the image data of one frame and that invites the user to perform an editing operation, which serves as a compressed feature.

The range of information that can be used as the processing feature differs from the range of information that can be used as the compressed feature, but some information can be used either as the processing feature or the compressed feature.

For example, the high-order two bits of a bit sequence representing pixel values of image data of one frame, serving as a compression feature in the case described with reference to FIG. 12, can also be used as a processing feature.

In the image processing apparatus 13 shown in FIG. 18, the feature extractor 141 extracts a compressed feature that can also be used as a processing feature (or a processing feature that can also be used as a compressed feature) as described above from image data of one frame.

Thus, in the image processing apparatus 13 shown in FIG. 18, processing information is recorded on the recording medium 124 in association with a compressed feature that also serves as a processing feature.

In the image processing apparatus 13 shown in FIG. 18, the feature recording process (FIG. 9), the editing/playback process (FIG. 10), and the simple editing process (FIG. 11) are executed in the same manners as in the case shown in FIG. 8, except in that processing executed using a processing feature in the case shown in FIG. 8 is executed using a compressed feature. Thus, description of processes executed by the image processing apparatus 13 shown in FIG. 18 will be omitted.

In the image processing apparatus 13 shown in FIG. 18, the same information is used as a compressed feature and a processing feature. In contrast, as a compressed feature and a processing feature, either the same information or different information can be used.

Also in the image processing apparatus 13 shown in FIG. 16, similarly to the image processing apparatus 13 shown in FIG. 13, it is possible to use the same information as a compressed feature and a processing feature and to use the single feature extractor 141 instead of the two feature extractors 41 and 121.

The series of processes described above can be executed either by hardware or by software. When the series of processes is executed by software, a program that serves as the software is installed on a general-purpose computer or the like.

FIG. 19 shows an example configuration of a computer on which a program for executing the series of processes described above is installed.

The program can be recorded in advance in a hard disk 205 or a read-only memory (ROM) 203, which is provided as a recording medium internally in the computer.

Alternatively, the program may be temporarily or permanently stored (recorded) on a removable recording medium 211, such as a flexible disk, a compact disc read-only memory (CD-ROM), a magneto-optical (MO) disk, a digital versatile disc (DVD), a magnetic disc, or a semiconductor memory. The removable recording medium 211 can be provided in the form of what is called package software.

Instead of installing the program on a computer from the removable recording medium 211 as described above, the program may be transferred by wireless to a computer from a downloading site via an artificial satellite for digital satellite broadcasting, or transferred by wire to a computer via a network, such as a local area network (LAN) or the Internet, so that the computer can receive the transferred program by a communication unit 208 and install the program on the internal hard disk 205.

The computer includes a central processing unit (CPU) 202. The CPU 202 is connected to an input/output interface 210 via a bus 201. When an instruction is input to the CPU 202 via the input/output interface 210, for example, in response to a user's operation of an input unit 207 including a keyboard, a mouse, a microphone, etc., the CPU 202 executes a program stored in the ROM 203 according to the instruction. Alternatively, the CPU 202 loads in a random access memory (RAM) 204 and executes a program stored in the hard disk 205, a program transferred from a satellite or a network and received by the communication unit 208 and installed on the hard disk 205, or a program read from the removable recording medium 211 mounted on a drive 209 and installed on the hard disk 205. Thus, the CPU 202 executes processes according to the flowcharts or processes executed by the configurations shown in block diagrams and described earlier. Furthermore, as needed, for example, the CPU 202 outputs the result of processing from an output unit 206 including a liquid crystal display (LCD), a speaker, etc., sends the result of processing from the communication unit 208, records the result of processing on the hard disk 205, or the like, via the input/output interface 210.

The steps defining the program for causing a computer to execute various processes need not necessarily be executed sequentially in the orders shown in the flowcharts, and may include processing executed in parallel or individually (e.g., parallel processing or processing by objects).

Furthermore, the program may be executed either by a single computer or by distributed processing using a plurality of computers. Furthermore, the program may be transferred to and executed by a remote computer.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
compressed-feature extracting means for extracting a compressed feature from image data, the compressed feature being a feature having a less amount of data than the image data;
display controlling means for displaying the compressed feature;
processing-information determining means for determining processing that is to be executed on the image data and outputting processing information representing the processing; and
recording means for recording the processing information on a recording medium in association with a processing feature, the processing feature being a specific feature of the image data on which the processing represented by the processing information is to be executed.

2. The image processing apparatus according to claim 1, wherein the processing-information determining means determines the processing that is to be executed on the image data according to an operation of operating means by a user.

3. The image processing apparatus according to claim 1, wherein the compressed-feature extracting means extracts a plurality of types of compressed features, and wherein the display controlling means displays at least one type of compressed feature among the plurality of types of compressed features.

4. The image processing apparatus according to claim 1, wherein the compressed feature is recorded on the recording medium, and wherein the display controlling means displays the compressed feature recorded on the recording medium.

5. The image processing apparatus according to claim 1, wherein the processing feature is a sum of pixel values of pixels in a specific area of the image data.

6. The image processing apparatus according to claim 1, wherein the compressed feature is information representing motion in the image data.

7. The image processing apparatus according to claim 1, wherein the compressed feature is information representing spatial activity in the image data.

8. The image processing apparatus according to claim 1, wherein the compressed feature is a part of a bit sequence representing pixel values of the image data.

9. The image processing apparatus according to claim 1, further comprising:
processing-feature extracting means for extracting the processing feature,
wherein the processing feature and the compressed feature are different information.

10. The image processing apparatus according to claim 1, wherein the processing feature and the compressed feature are the same information.

11. The image processing apparatus according to claim 1, further comprising:
processing-feature extracting means for extracting the processing feature from the image data;
matching-feature detecting means for detecting a matching feature from processing features recorded on the recording medium, the matching feature being a processing feature having a value matching the processing feature extracted by the processing-feature extracting means; and
processing reflecting means for executing the processing represented by the processing information associated with the matching feature on the recording medium, on the image data from which the processing feature having the value matching the matching feature has been extracted.

12. An image processing method comprising the steps of:
extracting a compressed feature from image data, the compressed feature being a feature having a less amount of data than the image data;
displaying the compressed feature;
determining processing that is to be executed on the image data and outputting processing information representing the processing; and
recording the processing information on a recording medium in association with a processing feature, the processing feature being a specific feature of the image data on which the processing represented by the processing information is to be executed.

13. A non-transitory tangible recording medium storing a program, which, when executed on a computer, causes the computer to execute image processing comprising the steps of:
extracting a compressed feature from image data, the compressed feature being a feature having a less amount of data than the image data;
displaying the compressed feature;
determining processing that is to be executed on the image data and outputting processing information representing the processing; and
recording the processing information on a recording medium in association with a processing feature, the processing feature being a specific feature of the image data on which the processing represented by the processing information is to be executed.

14. An image processing apparatus comprising:
compressed-feature extracting means for extracting a compressed feature from image data, the compressed feature being a feature having a less amount of data than the image data;
display controlling means for displaying the compressed feature;
processing-information determining means for determining processing that is to be executed on the image data according to an operation of operating means by a user, and outputting processing information representing the processing; and
recording means for recording the processing information on a recording medium in association with the compressed feature extracted from the image data on which the processing represented by the processing information is to be executed.

15. The image processing apparatus according to claim 14, further comprising:
matching-feature detecting means for detecting a matching feature from compressed features recorded on the recording medium, the matching feature being a compressed feature having a value matching the compressed feature extracted by the compressed-feature extracting means; and
processing reflecting means for executing the processing represented by the processing information associated with the matching feature on the recording medium, on the image data from which the compressed feature having the value matching the matching feature has been extracted.

16. An image processing method comprising the steps of:
- extracting a compressed feature from image data, the compressed feature being a feature having a less amount of data than the image data;
- displaying the compressed feature;
- determining processing that is to be executed on the image data according to an operation of operating means by a user, and outputting processing information representing the processing; and
- recording the processing information on a recording medium in association with the compressed feature extracted from the image data on which the processing represented by the processing information is to be executed.

17. A non-transitory tangible recording medium storing a program, which, when executed on a computer, causes the computer to execute image processing comprising the steps of:
- extracting a compressed feature from image data, the compressed feature being a feature having a less amount of data than the image data;
- displaying the compressed feature;
- determining processing that is to be executed on the image data according to an operation of operating means by a user, and outputting processing information representing the processing; and
- recording the processing information on a recording medium in association with the compressed feature extracted from the image data on which the processing represented by the processing information is to be executed.

18. An image processing apparatus comprising:
- a compressed-feature extractor configured to extract a compressed feature from image data, the compressed feature being a feature having a less amount of data than the image data;
- a display controller configured to display the compressed feature;
- a processing-information determining unit configured to determine processing that is to be executed on the image data and to output processing information representing the processing; and
- a recorder configured to record the processing information on a recording medium in association with a processing feature, the processing feature being a specific feature of the image data on which the processing represented by the processing information is to be executed.

19. An image processing apparatus comprising:
- a compressed-feature extractor configured to extract a compressed feature from image data, the compressed feature being a feature having a less amount of data than the image data;
- a display controller configured to display the compressed feature;
- a processing-information determining unit configured to determine processing that is to be executed on the image data according to an operation of operating means by a user, and to output processing information representing the processing; and
- a recorder configured to record the processing information on a recording medium in association with the compressed feature extracted from the image data on which the processing represented by the processing information is to be executed.

* * * * *